US012635035B2

(12) United States Patent
Ko et al.

(10) Patent No.: US 12,635,035 B2
(45) Date of Patent: May 19, 2026

(54) METHOD AND DEVICE FOR CONNECTING RESOURCES THROUGH RESOURCE RESELECTION UNDER SL DRX OPERATION IN NR V2X

(71) Applicant: LG Electronics Inc., Seoul (KR)

(72) Inventors: Woosuk Ko, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 303 days.

(21) Appl. No.: 18/579,764

(22) PCT Filed: Jul. 15, 2022

(86) PCT No.: PCT/KR2022/010356
§ 371 (c)(1),
(2) Date: Jan. 16, 2024

(87) PCT Pub. No.: WO2023/287244
PCT Pub. Date: Jan. 19, 2023

(65) Prior Publication Data
US 2024/0334534 A1 Oct. 3, 2024

Related U.S. Application Data

(60) Provisional application No. 63/251,015, filed on Sep. 30, 2021.

(30) Foreign Application Priority Data

Jul. 16, 2021 (KR) .......................... 10-2021-0093715
Jul. 23, 2021 (KR) .......................... 10-2021-0096881
Oct. 7, 2021 (KR) .......................... 10-2021-0133426

(51) Int. Cl.
*H04W 76/28* (2018.01)
*H04W 72/25* (2023.01)

(52) U.S. Cl.
CPC ........... *H04W 76/28* (2018.02); *H04W 72/25* (2023.01)

(58) Field of Classification Search
None
See application file for complete search history.

(56) References Cited

U.S. PATENT DOCUMENTS

2022/0287084 A1* 9/2022 Ko ..................... H04W 72/0446
2022/0322486 A1 10/2022 Park et al.
(Continued)

FOREIGN PATENT DOCUMENTS

KR 10-2021-0016278 2/2021
WO 2017138378 A1 8/2017
WO 2021029672 A1 2/2021
WO 2021139719 A1 7/2021

OTHER PUBLICATIONS

Fujitsu, "Considerations on partial sensing and DRX in NR Sidelink," 3GPP TSG RAN WG1 Meeting #105-e, R1-2105066, e-Meeting, May 10-27, 2021, 18 pages.
(Continued)

*Primary Examiner* — Anh Vu H Ly
(74) *Attorney, Agent, or Firm* — Fish & Richardson P.C.

(57) ABSTRACT

Proposed is an operation method of a first device (100) in a wireless communication system. The method may comprise the steps of: selecting, in a resource selection window, a first resource and a second resource included in a first active time including the time when a timer, which is related to an SL DRX configuration of a second device (200) and to an active time included in the SL DRX configuration, was to have operated on the basis of reception performed on the basis of the first resource; and reselecting the first resource as a third resource in the resource selection window, wherein the third resource causes the second resource to be included in a second active time including the time when the timer related
(Continued)

obtaining an SL DRX configuration related to a second device ~S1010 obtaining information related to a resource pool ~S1020 triggering resource selection for a transmission of a first MAC PDU ~S1030 determining a resource selection window for a resource selection in a resource pool ~S1040 selecting a first resource and a second resource included within a first active time related to an SL DRX configuration, in a resource selection window ~S1050 reselecting a first resource to a third resource in a resource selection window ~S1060 transmitting, to a second device, first SCI for scheduling of a PSSCH through a PSCCH, based on a third resource ~S1070 transmitting, to a second device, a first MAC PDU through a PSSCH, based on a third resource ~S1080 to the active time operates on the basis of reception performed on the basis of the third resource.

15 Claims, 15 Drawing Sheets

(56) References Cited

U.S. PATENT DOCUMENTS

| | | | | |
|---|---|---|---|---|
| 2023/0363050 | A1* | 11/2023 | Zeng ................. | H04W 52/0216 |
| 2024/0022967 | A1* | 1/2024 | Liu ................... | H04W 28/0268 |
| 2024/0163962 | A1* | 5/2024 | Freda ................... | H04W 76/23 |
| 2024/0244640 | A1* | 7/2024 | Park ...................... | H04W 72/25 |

OTHER PUBLICATIONS

International Search Report and Written Opinion in International Appln. No. PCT/KR2022/010356, mailed on Oct. 11, 2022, 17 pages (with English translation).

LG Electronics, "Discussion on resource allocation for power saving," 3GPP TSG RAN WG1 Meeting #104bis-e, R1-2103378, e-Meeting, Apr. 12-20, 2021, 21 pages.
Qualcomm Incorporated, "Discussion on SL DRX Timers and Others," 3GPP TSG RAN WG1 Meeting #114-e, R2-2105906, e-Meeting, May 19-27, 2021, 6 pages.
Vivo, "SL DRX Configuration Impact on RAN1 and RAN2," 3GPP TSG RAN WG1 Meeting #114-e, R2-2105351, e-Meeting, May 19-27, 2021, 9 pages.
Extended European Search Report in European Appln No. 24211459. 3, mailed on Jan. 8, 2025, 15 pages.
LG Electronics Inc., "Further discussion on Sidelink DRX," R2-2105297, 3GPP TSG-RAN WG2 Meeting #114-e, Electronics Meeting, May 19-27, 2021, 6 pages.
LG Electronics Inc., "Power efficient resource allocation," R2-2101795, 3GPP TSG-RAN WG2 Meeting #113 Electronic, Online, Jan. 25-Feb. 5, 2021, 4 pages.
Office Action in Japanese Appln. No. 2024-502490, mailed on Jan. 28, 2025, 9 pages (with English translation).

* cited by examiner

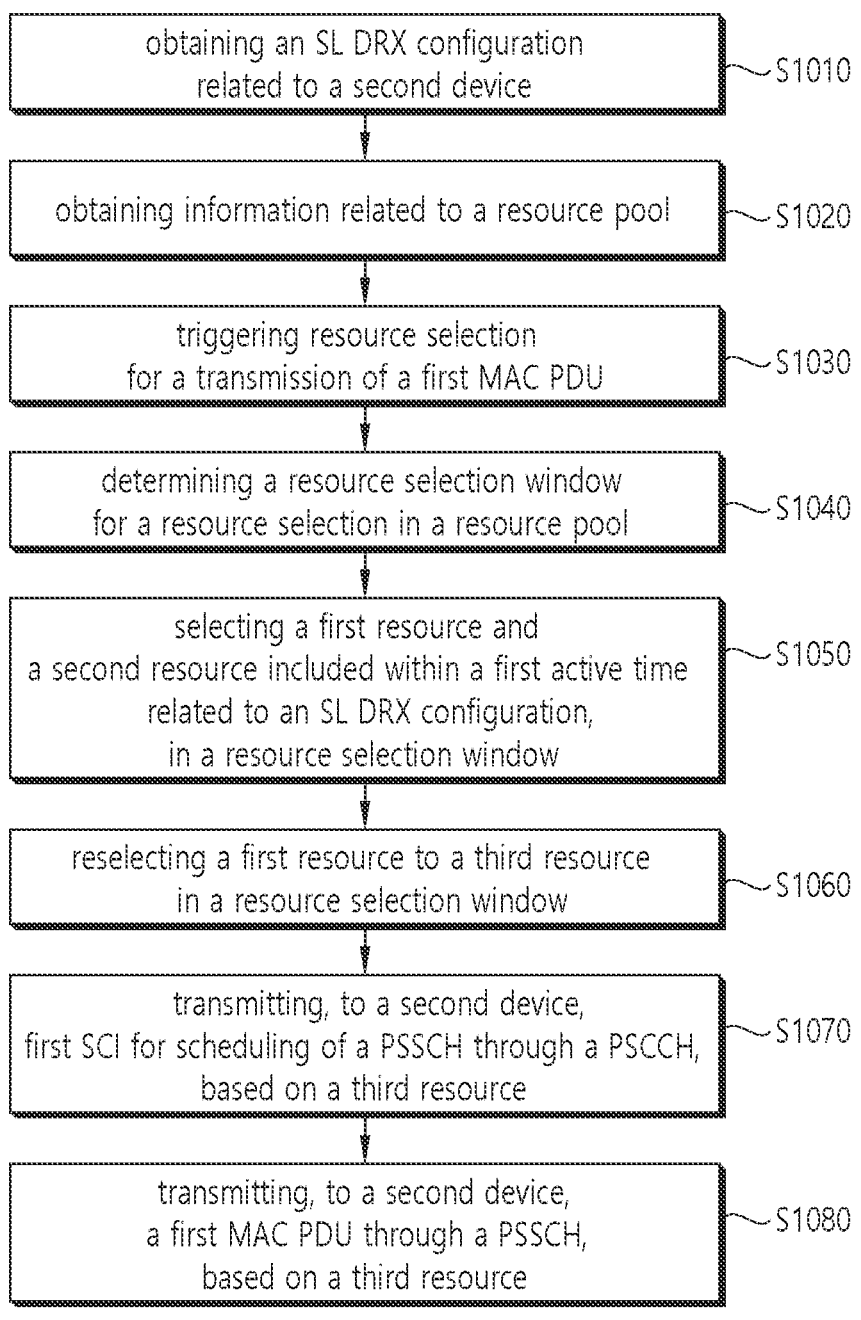

obtaining an SL DRX configuration
related to a second device ~S1010 obtaining information related to a resource pool ~S1020 triggering resource selection
for a transmission of a first MAC PDU ~S1030 determining a resource selection window
for a resource selection in a resource pool ~S1040 selecting a first resource and
a second resource included within a first active time
related to an SL DRX configuration,
in a resource selection window ~S1050 reselecting a first resource to a third resource
in a resource selection window ~S1060 transmitting, to a second device,
first SCI for scheduling of a PSSCH through a PSCCH,
based on a third resource ~S1070 transmitting, to a second device,
a first MAC PDU through a PSSCH,
based on a third resource ~S1080

FIG. 11

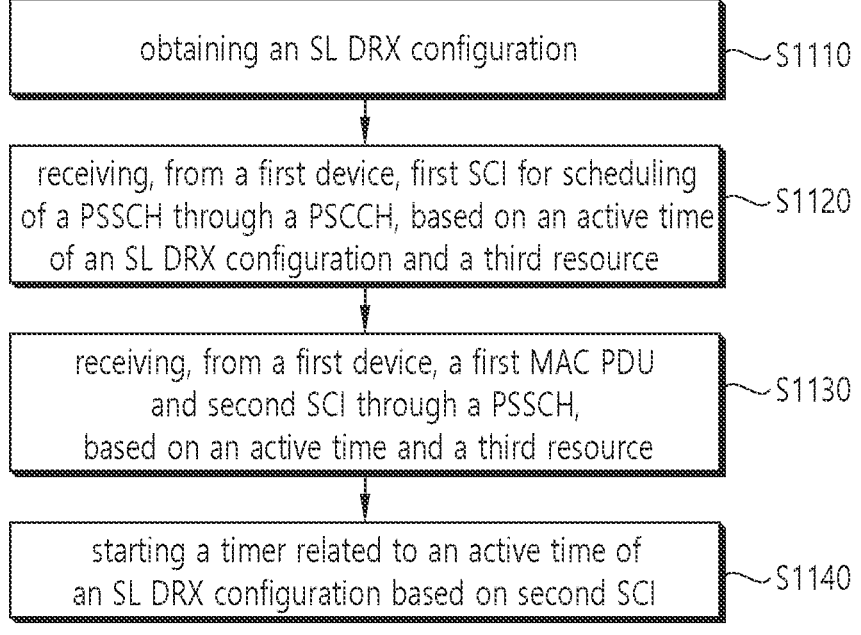

obtaining an SL DRX configuration ~S1110 receiving, from a first device, first SCI for scheduling
of a PSSCH through a PSCCH, based on an active time
of an SL DRX configuration and a third resource ~S1120 receiving, from a first device, a first MAC PDU
and second SCI through a PSSCH,
based on an active time and a third resource ~S1130 starting a timer related to an active time of
an SL DRX configuration based on second SCI ~S1140

Device (100,200)

METHOD AND DEVICE FOR CONNECTING RESOURCES THROUGH RESOURCE RESELECTION UNDER SL DRX OPERATION IN NR V2X

CROSS-REFERENCE TO RELATED APPLICATIONS

This application is a National Stage application under 35 U.S.C. § 371 of International Application No. PCT/KR2022/010356, filed on Jul. 15, 2022, which claims the benefit of Korean Patent Application No. 10-2021-0093715, filed on Jul. 16, 2021, Korean Patent Application No. 10-2021-0096881, filed on Jul. 23, 2021, U.S. Provisional Application No. 63/251,015, filed on Sep. 30, 2021, and Korean Patent Application No. 10-2021-0133426, filed on Oct. 7, 2021. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

According to an embodiment of the present disclosure, a method for performing, by a first device, wireless communication may be proposed. For example, the method may comprise: obtaining a sidelink (SL) discontinuous reception (DRX) configuration related to a second device; obtaining information related to a resource pool; triggering resource selection for a transmission of a first medium access control (MAC) protocol data unit (PDU); determining a resource selection window for the resource selection in the resource pool, selecting a first resource and a second resource included within a first active time related to the SL DRX configuration, in the resource selection window; reselecting the first resource to a third resource in the resource selection window, wherein the third resource may be a resource that causes the second resource to be included within a second active time; transmitting, to the second device, first sidelink control information (SCI) for scheduling of a physical sidelink shared channel (PSSCH) through a physical sidelink control channel (PSCCH), based on the third resource; and transmitting, to the second device, the first MAC PDU through the PSSCH, based on the third resource, wherein the first active time may include a time when a timer related to an active time included in the SL DRX configuration would have run based on a reception performed based on the first resource, and wherein the second active time may include a time during which the timer related to an active time runs based on a reception performed based on the third resource.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration related to a second device; obtain information related to a resource pool; trigger resource selection for a transmission of a first medium access control (MAC) protocol data unit (PDU); determine a resource selection window for the resource selection in the resource pool; select a first resource and a second resource included within a first active time related to the SL DRX configuration, in the resource selection window; reselect the first resource to a third resource in the resource selection window, wherein the third resource may be a resource that causes the second resource to be included within a second active time; transmit, to the second device, first sidelink control information (SCI) for scheduling of a physical sidelink shared channel (PSSCH) through a physical sidelink control channel (PSCCH), based on the third resource; and transmit, to the second device, the first MAC PDU through the PSSCH, based on the third resource, wherein the first active time may include a time when a timer related to an active time included in the SL DRX configuration would have run based on a reception performed based on the first resource, and wherein the second active time may include a time during which the timer related to an active time runs based on a reception performed based on the third resource.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain a sidelink (SL) discontinuous reception (DRX) configuration related to a second UE; obtain information related to a resource pool; trigger resource selection for a transmission of a first medium access control (MAC) protocol data unit (PDU); determine a resource selection window for the resource selection in the resource pool, select a first resource and a second resource included within a first active time related to the SL DRX configuration, in the resource selection window; reselect the first resource to a third resource in the resource selection window, wherein the third resource may be a resource that causes the second resource to be included within a second active time; transmit, to the second UE, first sidelink control information (SCI) for scheduling of a physical sidelink shared channel (PSSCH) through a physical sidelink control channel (PSCCH), based on the third resource; and transmit, to the second UE, the first MAC PDU through the PSSCH, based on the third resource, wherein the first active time may include a time when a timer related to an active time included in the SL DRX configuration would have run based on a reception performed based on the first resource, and wherein the second active time may include a time during which the timer related to an active time runs based on a reception performed based on the third resource.

According to an embodiment of the present disclosure, a non-transitory computer-readable storage medium storing instructions may be proposed. For example, when executed, the instructions may cause a first device to: obtain a sidelink (SL) discontinuous reception (DRX) configuration related to a second device; obtain information related to a resource pool; trigger resource selection for a transmission of a first medium access control (MAC) protocol data unit (PDU); determine a resource selection window for the resource selection in the resource pool; select a first resource and a second resource included within a first active time related to the SL DRX configuration, in the resource selection window; reselect the first resource to a third resource in the resource selection window, wherein the third resource may be a resource that causes the second resource to be included within a second active time; transmit, to the second device, first sidelink control information (SCI) for scheduling of a physical sidelink shared channel (PSSCH) through a physical sidelink control channel (PSCCH), based on the third resource; and transmit, to the second device, the first MAC PDU through the PSSCH, based on the third resource, wherein the first active time may include a time when a timer related to an active time included in the SL DRX configuration would have run based on a reception performed based on the first resource, and wherein the second active time may include a time during which the timer related to an active time runs based on a reception performed based on the third resource.

According to an embodiment of the present disclosure, a method for performing, by a second device, wireless communication may be proposed. For example, the method may comprise: obtaining a sidelink (SL) discontinuous reception (DRX) configuration: receiving, from a first device, first sidelink control information (SCI) for scheduling of a physical sidelink shared channel (PSSCH) through a physical sidelink control channel (PSCCH), based on an active time of the SL DRX configuration and a third resource, wherein the first SCI may include information related to a second resource; receiving, from the first device, a first medium access control (MAC) protocol data unit (PDU) and second SCI through the PSSCH, based on the active time and the third resource; and starting a timer related to an active time of the SL DRX configuration based on the second SCI, wherein the second resource may be included within an interval during which the timer related to an active time of the SL DRX configuration being running, wherein the third resource may be a resource reselected from a first resource, and wherein the second resource may be included within a time when the timer related to an active time of the SL DRX configuration would have run based on a reception performed based on the first resource.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration: receive, from a first device, first sidelink control information (SCI) for scheduling of a physical sidelink shared channel (PSSCH) through a physical sidelink control channel (PSCCH), based on an active time of the SL DRX configuration and a third resource, wherein the first SCI may include information related to a second resource, receive, from the first device, a first medium access control (MAC) protocol data unit (PDU) and second SCI through the PSSCH, based on the active time and the third resource; and start a timer related to an active time of the SL DRX configuration based on the second SCI, wherein the second resource may be included within an interval during which the timer related to an active time of the SL DRX configuration being running, wherein the third resource may be a resource reselected from a first resource, and wherein the second resource may be included within a time when the timer related to an active time of the SL DRX configuration would have run based on a reception performed based on the first resource.

The user equipment (UE) may efficiently perform SL communication.

BRIEF DESCRIPTION OF THE DRAWINGS

FIG. 2 shows a radio protocol architecture, based on an embodiment of the present disclosure.

FIG. 10 shows a procedure for a first device to perform wireless communication, according to one embodiment of the present disclosure.

FIG. 11 shows a procedure for a second device to perform wireless communication, according to one embodiment of the present disclosure.

DETAILED DESCRIPTION

Figure 1:
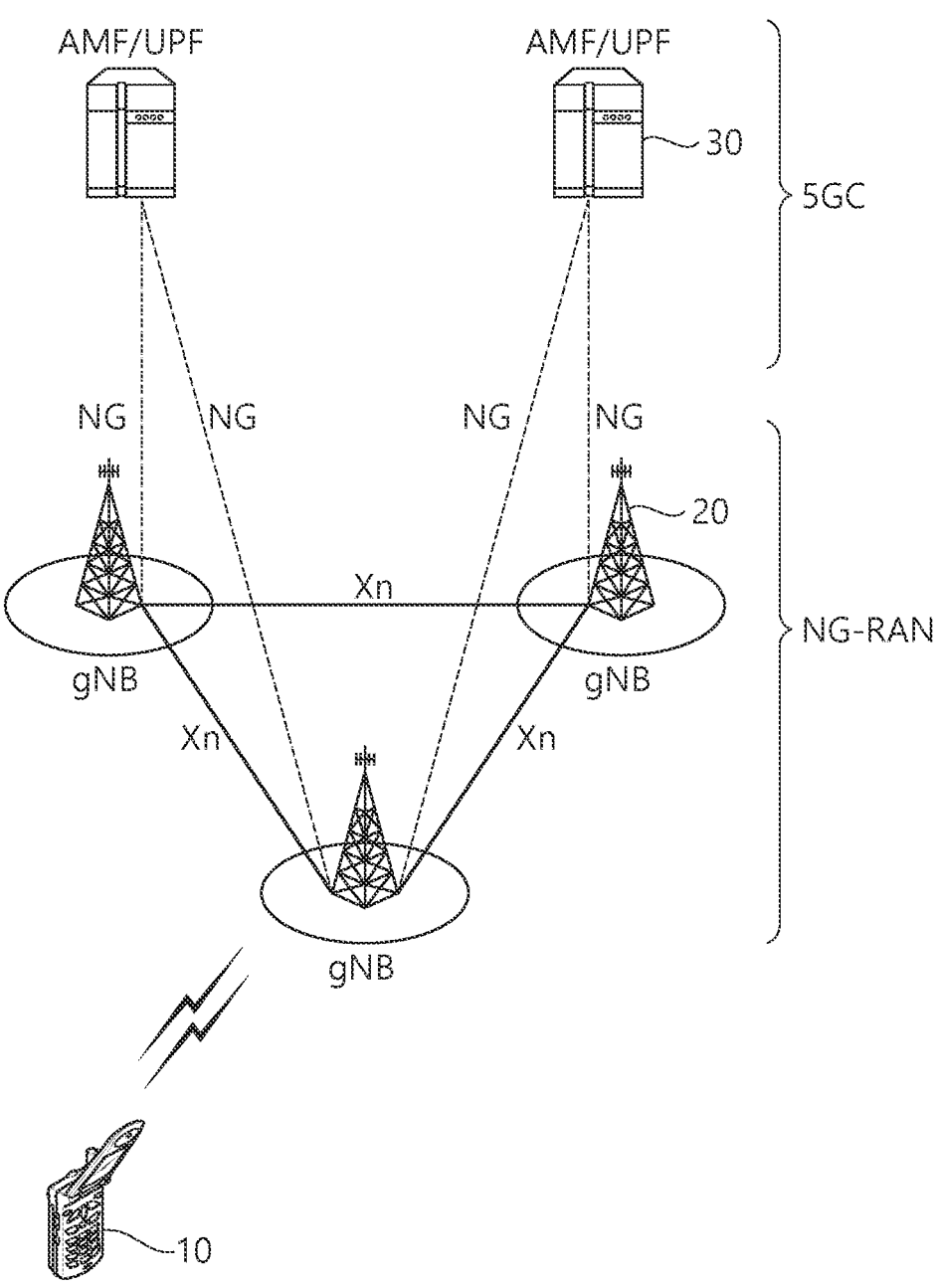
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly. "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system inter-connection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
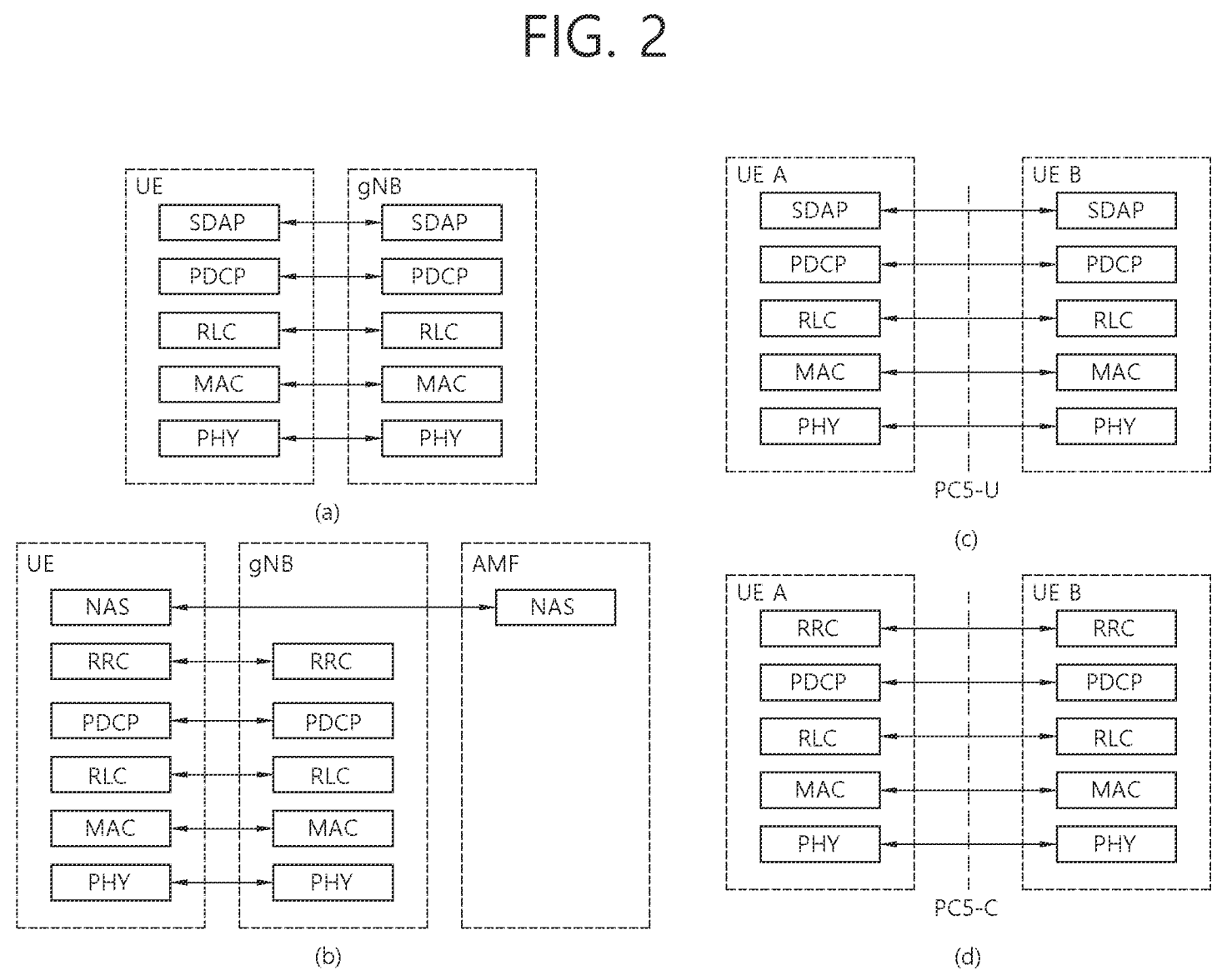

FIG. 2 shows a radio protocol architecture, based on an embodiment of the present disclosure. The embodiment of FIG. 2 may be combined with various embodiments of the present disclosure. Specifically. (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
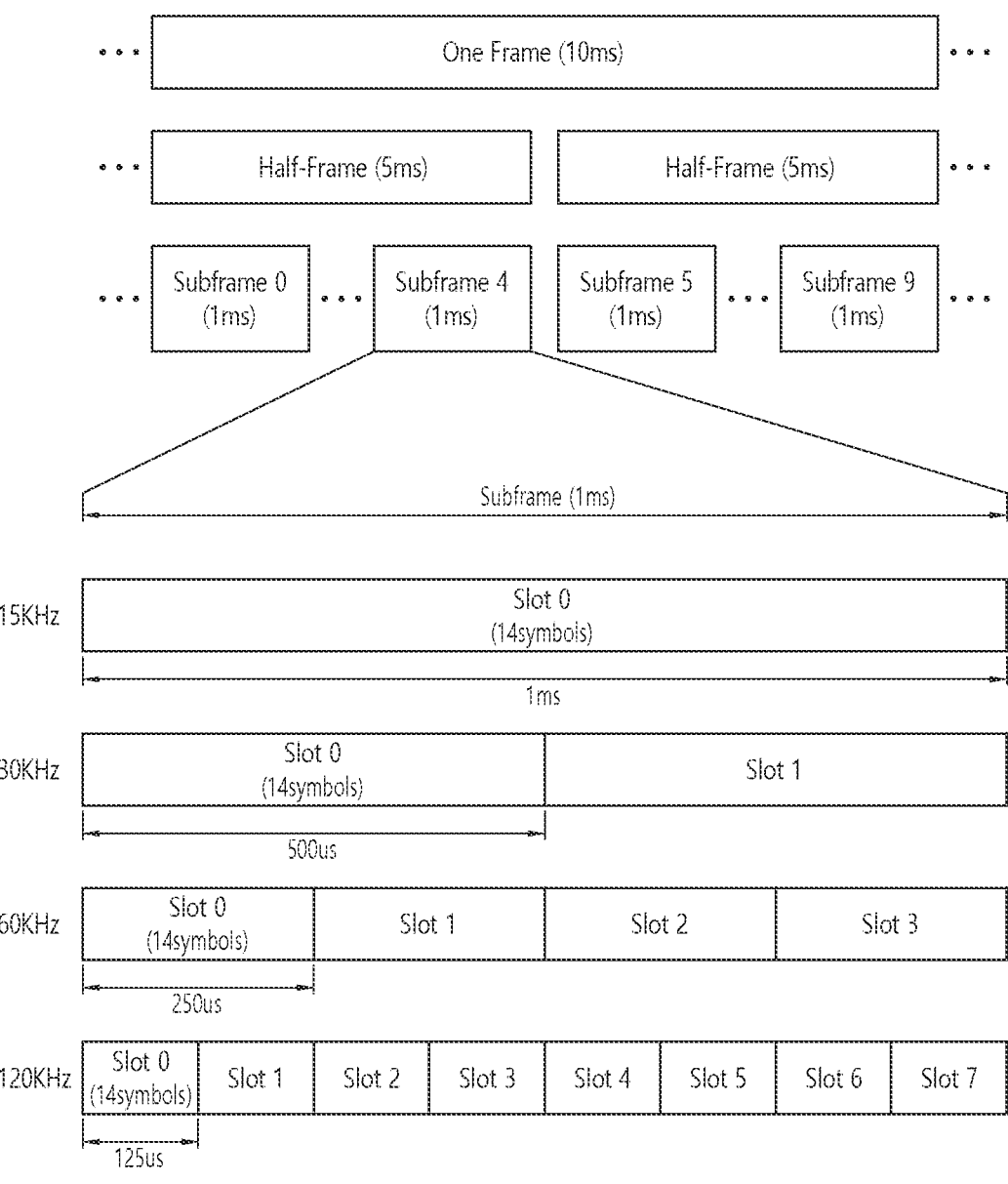
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system. OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4. FR1 may include a band within a range of 410 MHz to 7125 MHz. More specifically. FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
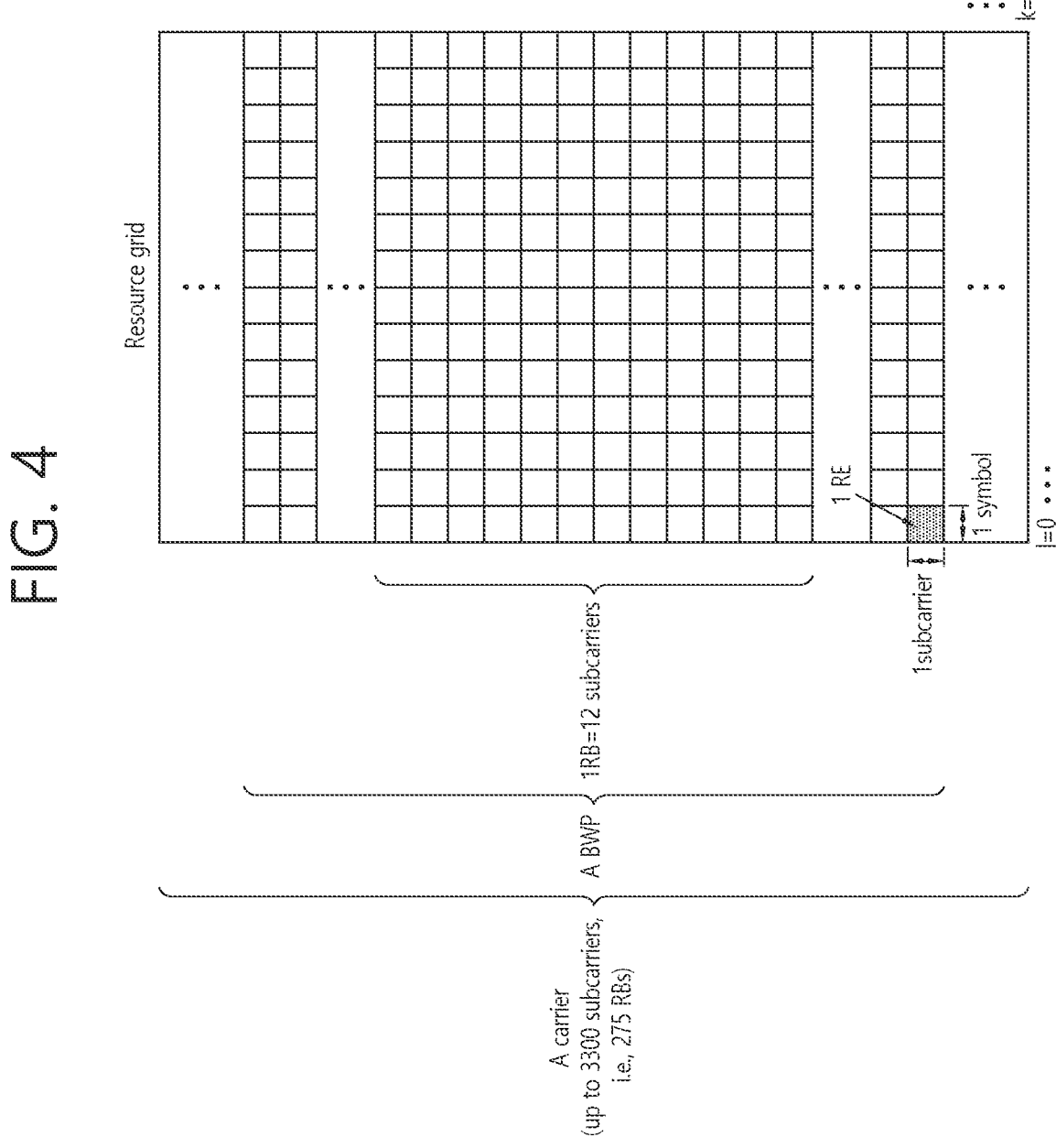
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols. A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on).

A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
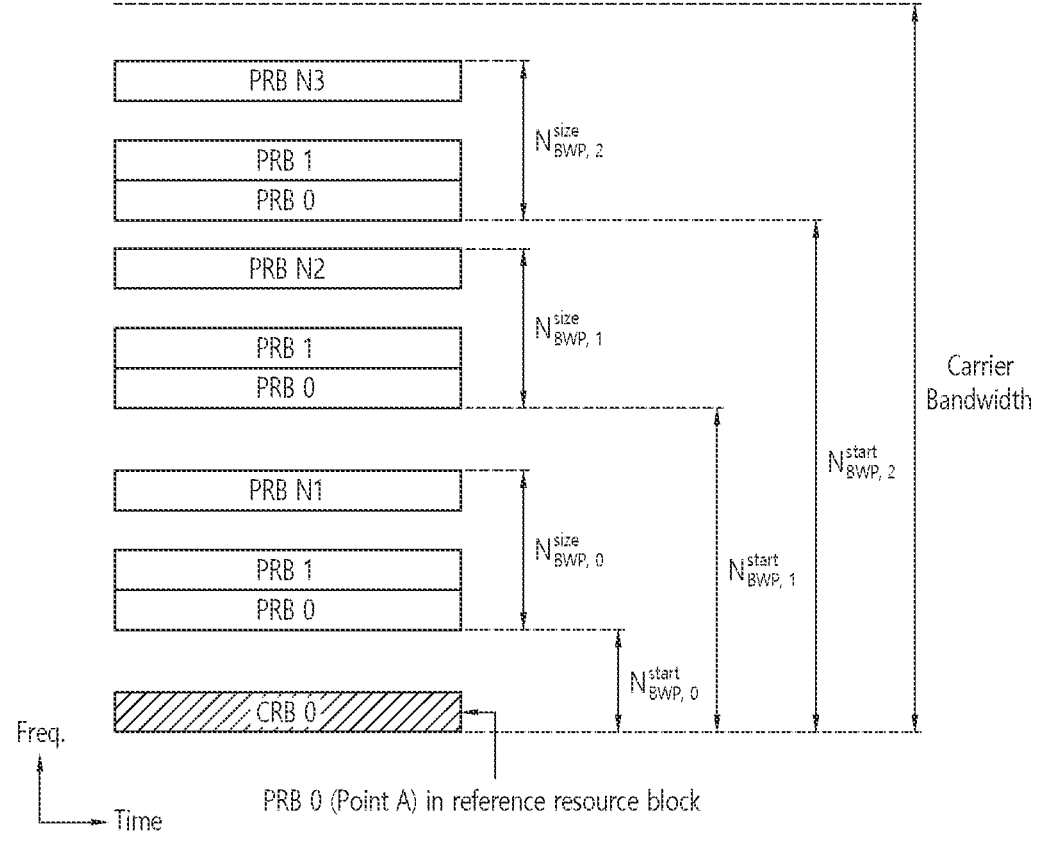
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
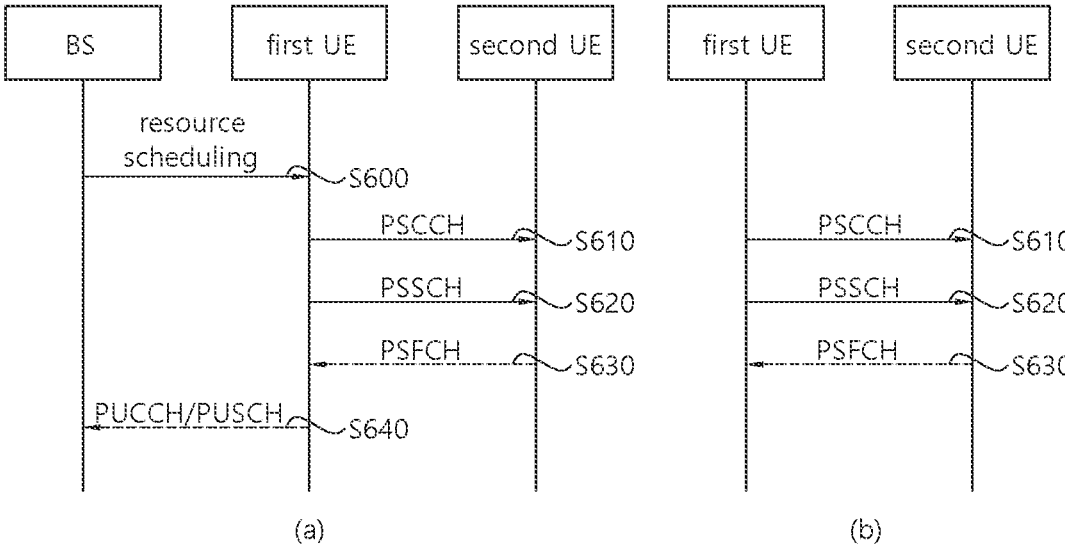
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s)

to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, a first UE may transmit SCI to a second UE on PSCCH. Alternatively, for example, a first UE may transmit two consecutive SCI (e.g., 2-stage SCI) to a second UE on PSCCH and/or PSSCH. In this case, a second UE may decode two consecutive SCIs (e.g., 2-stage SCI) in order to receive the PSSCH from a first UE. In this specification, SCI transmitted on PSCCH may be referred to as a 1st SCI, SCI 1, 1st-stage SCI or 1st-stage SCI format, and SCI transmitted on the PSSCH may be referred to as a 2nd SCI, SCI 2, 2nd-stage SCI or 2nd-stage SCI format. For example, the 1st-stage SCI format may include SCI format 1-A, and the 2nd-stage SCI format may include SCI format 2-A and/or SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling $(\log_2 (N^{SL}_{subChannel}(N^{SL}_{subChannel}+1)/2))$ bits when the value of the higher layer parameter sl-MaxNumPerReserve is configured to 2; otherwise ceiling $\log_2(N^{SL}_{subChannel} (N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |

TABLE 5-continued

| Value of 2nd-stage SCI format field | 2nd-stage SCI format |
|---|---|
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, a first UE may receive the PSFCH. For example, a first UE and a second UE may determine PSFCH resources, and a second UE may transmit HARQ feedback to a first UE using the PSFCH resource.

Referring to (a) of FIG. 6, in step S640, the first UE may transmit SL HARQ feedback to the base station through the PUCCH and/or the PUSCH.

Hereinafter, a UE procedure for determining a subset of resources to be reported to a higher layer in PSSCH resource selection in sidelink resource allocation mode 2 will be described.

In resource allocation mode 2, a higher layer may request a UE to determine a subset of resources, from which the higher layer will select a resource for PSSCH/PSCCH transmission. To trigger this procedure, in slot n, a higher layer provides the following parameters for a PSSCH/PSCCH transmission.

the resource pool from which the resources are to be reported;

L1 priority, $\text{prio}_{TX}$;

the remaining packet delay budget;

the number of sub-channels to be used for the PSSCH/PSCCH transmission in a slot, $L_{subCH}$;

optionally, the resource reservation interval, $P_{rsvp\_TX}$, in units of msec.

if the higher layer requests the UE to determine a subset of resources from which the higher layer will select resources for PSSCH/PSCCH transmission as part of re-evaluation or pre-emption procedure, the higher layer provides a set of resources ($r_0, r_1, r_2, \ldots$) which may be subject to re-evaluation and a set of resources $$(r_0', r_1', r_2', \ldots)$$

which may be subject to pre-emption.

it is up to UE implementation to determine the subset of resources as requested by higher layers before or after the slot $$r_i''$$

-$T_3$, where $$r_i''$$

is the slot with the smallest slot index among ($r_0, r_1, r_2, \ldots$) and $$(r_0', r_1', r_2', \ldots),$$

and $T_3$ is equal to $$T_{proc,1}^{SL},$$

where $$T_{proc,1}^{SL}$$

is defined in slots, where $\mu_{SL}$ is the SCS configuration of the SL BWP.

Following higher layer parameters affect this procedure:

sl-SelectionWindowList: internal parameter $T_{2min}$ is set to the corresponding value from higher layer parameter sl-SelectionWindowList for the given value of $\text{prio}_{TX}$.

sl-Thres-RSRP-List: this higher layer parameter provides an RSRP threshold for each combination ($p_i, p_j$), where $p_i$ is the value of the priority field in a received SCI format 1-A and $p_j$ is the priority of the transmission of the UE selecting resources; for a given invocation of this procedure, $p_j = \text{prio}_{TX}$.

sl-RS-ForSensing selects if the UE uses the PSSCH-RSRP or PSCCH-RSRP measurement.

sl-ResourceReservePeriodList sl-SensingWindow: internal parameter $T_0$ is defined as the number of slots corresponding to sl-SensingWindow msec sl-TxPercentageList: internal parameter X for a given $\text{prio}_{TX}$ is defined as sl-TxPercentageList ($\text{prio}_{TX}$) converted from percentage to ratio sl-PreemptionEnable: if sl-PreemptionEnable is provided, and if it is not equal to 'enabled', internal parameter $\text{prio}_{pre}$ is set to the higher layer provided parameter sl-PreemptionEnable.

The resource reservation interval, $P_{rsvp\_TX}$, if provided, is converted from units of msec to units of logical slots, resulting in $P'_{rsvp\_TX}$.

Notation:

$$(t_0'^{SL}, t_1'^{SL}, t_2'^{SL}, \ldots)$$

denotes the set of slots which belongs to the sidelink resource pool.

For example, a UE may select a set of candidate resources (Sa) based on Table 8. For example, when resource (re) selection is triggered, a UE may select a candidate resource set (Sa) based on Table 8. For example, when re-evaluation or pre-emption is triggered, a UE may select a candidate resource set (Sa) based on Table 8.

TABLE 8

The following steps are used:

1) A candidate single-slot resource for transmission $R_{x,y}$ is defined as a set of $L_{subCH}$ contiguous sub-channels with sub-channel x+j in slot $t_y'^{SL}$ where j = 0, . . . , $L_{subCH}$ −

1. The UE shall assume that any set of $L_{subCH}$ contiguous sub-channels included in the corresponding resource pool within the time interval [n + $T_1$, n + $T_2$] correspond to one candidate single-slot resource, where

- selection of $T_1$ is up to UE implementation under $0 \le T_1 \le T_{proc,1}^{SL}$, where $T_{proc,1}^{SL}$ is defined in slots in Table 8.1.4-2 where $\mu_{SL}$ is the SCS configuration of the SL BWP;

- if $T_{2min}$ is shorter than the remaining packet delay budget (in slots) then $T_2$ is up to UE implementation subject to $T_{2min} \le T_2 \le$ remaining packet delay budget (in slots); otherwise $T_2$ is set to the remaining packet delay budget (in slots).

The total number of candidate single-slot resources is denoted by $M_{total}$.

TABLE 8-continued

Figure 7:
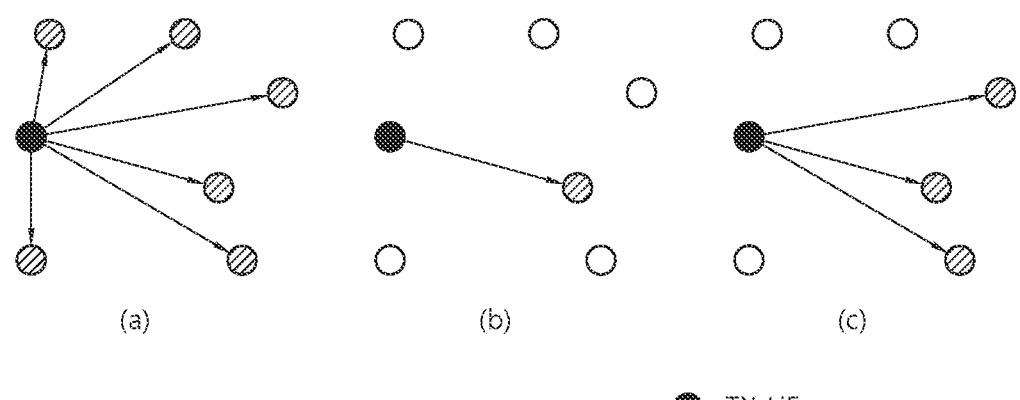
FIG. 7 shows three cast types, based on an embodiment of the present disclosure.

2) The sensing window is defined by the range of slots [n − $T_0$, n − $T_{proc,0}{}^{SL}$) where $T_0$ is defined above
and $T_{proc,0}{}^{SL}$ is defined in slots in Table 8.1.4-1 where $\mu_{SL}$ is the SCS configuration of the SL
BWP. The UE shall monitor slots which belongs to a sidelink resource pool within the sensing
window except for those in which its own transmissions occur. The UE shall perform the behaviour in
the following steps based on PSCCH decoded and RSRP measured in these slots.
3) The internal parameter $Th(p_i, p_j)$ is set to the corresponding value of RSRP threshold
indicated by the i-th field in sl-Thres-RSRP-List, where i = $p_i$ + ($p_j$ − 1) * 8.
4) The set $S_A$ is initialized to the set of all the candidate single-slot resources.
5) The UE shall exclude any candidate single-slot resource $R_{x,y}$ from the set $S_A$ if it meets all the
following conditions:
- the UE has not monitored slot $t'_m{}^{SL}$ in Step 2
- for any periodicity value allowed by the higher layer parameter sl-ResourceReservePeriodList and
a hypothetical SCI format 1-A received in slot $t'_m{}^{SL}$ with 'Resource reservation period' field set to
that periodicity value and indicating all subchannels of the resource pool in this slot, condition c in
step 6 would be met.
5a) If the number of candidate single-slot resources $R_{x,y}$ remaining in the set $S_A$ is smaller than X ·
$M_{total}$, the set $S_A$ is initialized to the set of all the candidate single-slot resources as in step 4.
6) The UE shall exclude any candidate single-slot resource $R_{x,y}$ from the set $S_A$ if it meets all the
following conditions:
a) the UE receives an SCI format 1-A in slot $t'_m{}^{SL}$, and 'Resource reservation period' field, if present,
and 'Priority' field in the received SCI format 1-A indicate the values $P_{rsvp\_RX}$ and $prio_{RX}$,
respectively according to Clause 16.4 in [6, TS 38.213];
b) the RSRP measurement performed, according to clause 8.4.2.1 for the received SCI format 1-A, is
higher than $Th(prio_{RX}, prio_{TX})$;
c) the SCI format received in slot $t'_m{}^{SL}$ or the same SCI format which, if and only if the 'Resource
reservation period' field is present in the received SCI format 1-A, is assumed to be received in
slot(s) $t'^{SL}_{m+q \times P'_{rsvp\_RX}}$ determines according to clause 8.1.5 the set of resource blocks and slots
which overlaps with $R_{x,y+ j \times P'_{rsvp\_TX}}$ for q=1, 2, ... , Q and j=0, 1, . . . , $C_{reset}$ − 1. Here, $P'_{rsvp\_RX}$ is $P_{rsvp\_RX}$ converted to units of logical slots according to clause 8.1.7, $Q = \left\lceil \dfrac{T_{scal}}{P_{rsvp\_RX}} \right\rceil$ if $P_{rsvp\_RX} < T_{scal}$ and n' − m ≤ $P'_{rsvp\_Rx}$, where $t'_{n'}{}^{SL}$ = n if slot n belongs to the set
$(t'_0{}^{SL}, t'_1{}^{SL}, . . . , t'_{T_{max}-1}{}^{SL})$, otherwise slot $t'_{n'}{}^{SL}$ is the first slot after slot n belonging to the set
$(t'_0{}^{SL}, t'_1{}^{SL}, . . . , t'_{T_{max}-1}{}^{SL})$; otherwise Q = 1. $T_{scal}$ is set to selection window size $T_2$ converted
to units of msec.
7) If the number of candidate single-slot resources remaining in the set $S_A$ is smaller than X · $M_{total}$:
then $Th(p_i, p_j)$ is increased by 3 dB for each priority value $Th(p_i, p_j)$ and the procedure continues
with step 4.
The UE shall report set $S_A$ to higher layers.
If a resource $r_i$ from the set $(r_0, r_1, r_2, ... )$ is not a member of $S_A$, then the UE shall report re-evaluation of
the resource $r_i$ to higher layers.
If a resource $r'_i$ from the set $(r'_0, r'_1, r'_2, ... )$ meets the conditions below then the UE shall report pre-emption
of the resource $r'_i$ to higher layers
- $r'_i$ is not a member of $S_A$, and
- $r'_i$ meets the conditions for exclusion in step 6, with $Th(prio_{RX}, prio_{TX})$ set to the final threshold
after executing steps 1)-7), i.e. including all necessary increments for reaching X · $M_{total}$, and
- the associated priority $prio_{RX}$, satisfies one of the following conditions:
- sl-PreemptionEnable is provided and is equal to 'enabled' and $prio_{TX} > prio_{RX}$
- sl-PreemptionEnable is provided and is not equal to 'enabled', and $prio_{RX} < prio_{pre}$ and
$prio_{TX} > prio_{RX}$ FIG. 7 shows three cast types, in accordance with an embodiment of the present disclosure. The embodiment of FIG. 7 may be combined with various embodiments of the present disclosure. Specifically. FIG. 7(a) shows broadcast-type SL communication. FIG. 7(b) shows unicast type-SL communication, and FIG. 7(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

In this specification, the "configure or define" wording may be interpreted as being (pre)configured (via pre-defined signaling (e.g., SIB, MAC signaling, RRC signaling)) from a base station or a network. For example, "A may be configured" may include "that a base station or network (pre-)configures/defines or informs A for a UE". Alternatively, the wording "configure or define" may be interpreted as being configured or defined in advance by a system. For example, "A may be configured" may include "A is configured/defined in advance by a system".

Referring to the standard document, some procedures and technical specifications related to the present disclosure are shown below.

TABLE 9

3GPP TS 36.213 V16.2.0

14.1.1.6 UE procedure for determining the subset of resources to be reported to higher layers in
PSSCH resource selection in sidelink transmission mode 4 and in sensing measurement in
sidelink transmission mode 3

TABLE 9-continued

3GPP TS 36.213 V16.2.0

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_Tx}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$, and $prio_{TX}$ are all provided by higher layers (described in [11]). $C_{resel}$ is determined by $C_{resel} = 10*SL\_RESOURCE\_RESELECTION\_COUNTER$, where SL_RESOURCE_RESELECTION_COUNTER is provided by higher layers [11].

. . .

If partial sensing is configured by higher layers then the following steps are used:

1) A candidate single-subframe resource for PSSCH transmission $R_{x,\,y}$ is defined as a set of $L_{subCH}$ contiguous sub-channels with sub-channel x + j in subframe $t_y^{SL}$ where j = 0, . . . , $L_{subCH}$ − 1. The UE shall determine by its implementation a set of subframes which consists of at least Y subframes within the time interval [n + T₁, n + T₂] where selections of T₁ and T₂ are up to UE implementations under T₁ ≤ 4 and $T_{2\ min}(prio_{TX})$ ≤ T₂ ≤ 100, if $T_{2\ min}(prio_{TX})$ is provided by higher layers for $prio_{TX}$, otherwise 20 ≤ T₂ ≤ 100. UE selection of T₂ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,\,b}$ is set to the value indicated by the i-th SL-ThresPSSCH-RSRP field in SL-ThresPSSCH-RSRP-List where i = (a − 1) * 8 + b.

4) The set $S_A$ is initialized to the union of all the candidate single-subframe resources. The set $S_B$ is initialized to an empty set.

TABLE 10

5) The UE shall exclude any candidate single-subframe resource $R_{x,y}$ from the set $S_A$ if it meets all the following conditions:
   - the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
   - PSSCH-RSRP measurement according to the received SCI format 1 is higher than $Th_{prio_{TX},prio_{RX}}$.
   - the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+\ j \times P_{rsvp\_TX}}$ for q=1, 2, ... , Q and j=0, 1, ... , $C_{resel} − 1$. Here, $Q = \dfrac{1}{P_{rsvp\_RX}}$ if $P_{rsvp\_RX} < 1$ and $y' − m \le P_{step} \times P_{rsvp\_RX} + P_{step}$, where $t_{y'}^{SL}$ is the last subframe of the Y subframes , and Q = 1 otherwise.

6) If the number of candidate single-subframe resources remaining in the set $S_A$ is smaller than $0.2 \cdot M_{total}$, then Step 4 is repeated with $Th_{a,b}$ increased by 3 dB.

7) For a candidate single-subframe resource $R_{x,y}$ remaining in the set $S_A$, the metric $E_{x,y}$ is defined as the linear average of S-RSSI measured in sub-channels x+k for k=0, . . . ,$L_{subCH}−1$ in the monitored subframes in Step 2 that can be expressed by $t_{y-P_{step}*j}^{SL}$ for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

TABLE 11

The UE shall report set $S_B$ to higher layers.

If transmission based on random selection is configured by upper layers and when the UE is configured by upper layers to transmit using resource pools on multiple carriers, the following steps are used:

1) A candidate single-subframe resource for PSSCH transmission $R_{x,\,y}$ is defined as a set of $L_{subCH}$ TABLE 11-continued contiguous sub-channels with sub-channel x + j in subframe $t_y^{SL}$ where j = 0, . . . , $L_{subCH}$ − 1. The
UE shall assume that any set of $L_{subCH}$ contiguous sub-channels included in the corresponding
PSSCH resource pool (described in 14.1.5) within the time interval [n + $T_1$, n + $T_2$] corresponds
to one candidate single-subframe resource, where selections of $T_1$ and $T_2$ are up to UE
implementations under $T_1 \le 4$ and $T_{2\ min}(\mathrm{prio}_{TX}) \le T_2 \le 100$, if $T_{2\ min}(\mathrm{prio}_{TX})$ is provided by
higher layers for $\mathrm{prio}_{TX}$, otherwise $20 \le T_2 \le 100$ UE selection of $T_2$ shall fulfil the latency
requirement. The total number of the candidate single-subframe resources is denoted by $M_{total}$.
2) The set $S_A$ is initialized to the union of all the candidate single-subframe resources. The set $S_B$ is
initialized to an empty set.
3) The UE moves the candidate single-subframe resource $R_{x,\ y}$ from the set $S_A$ to $S_B$.
4) The UE shall exclude a candidate single-subframe resource $R_{x,\ y}$ from $S_B$ if the UE does not
support transmission in the candidate single-subframe resource in the carrier under the assumption
that transmissions take place in other carrier(s) using the already selected resources due to its
limitation in the number of simultaneous transmission carriers, its limitation in the supported carrier
combinations, or interruption for RF retuning time [10].
The UE shall report set $S_B$ to higher layers.

On the other hand, since there is no existing technology that combines partial sensing with SL DRX in prior art, there is a problem that it is not possible to further reduce power consumption by selecting resources through partial sensing when operating SL DRX.

According to one embodiment of the present disclosure, based on a resource selected by a transmitting UE performing partial sensing in SL DRX operation, a method for a receiving terminal to receive an associated retransmission without failing to retransmit a packet, and a device supporting the method are proposed.

For example, for (or, for each of) at least one among elements/parameters of service type (and/or (LCH or service) priority and/or QOS requirements (e.g., latency, reliability, minimum communication range) and/or PQI parameters) (and/or HARQ feedback enabled (and/or disabled) LCH/MAC PDU (transmission) and/or CBR measurement value of a resource pool and/or SL cast type (e.g., unicast, groupcast, broadcast) and/or SL groupcast HARQ feedback option (e.g., NACK only feedback, ACK/NACK feedback, NACK only feedback based on TX-RX distance) and/or SL mode 1 CG type (e.g., SL CG type 1/2) and/or SL mode type (e.g., mode 1/2) and/or resource pool and/or PSFCH resource configured resource pool and/or source (L2) ID (and/or destination (L2) ID) and/or PC5 RRC connection/ link and/or SL link and/or (with base station) connection state (e.g., RRC connected state, IDLE state, inactive state) and/or whether an SL HARQ process (ID) and/or (of a transmitting UE or a receiving UE) performs an SL DRX operation and/or whether it is a power saving (transmitting or receiving) UE and/or (from the perspective of a specific UE) case when PSFCH transmission and PSFCH reception (and/or a plurality of PSFCH transmissions (exceeding UE capability)) overlap (and/or a case where PSFCH transmission (and/or PSFCH reception) is omitted) and/or a case where a receiving UE actually (successfully) receives a PSCCH (and/or PSSCH) (re)transmission from a transmitting UE, etc.), whether the rule is applied (and/or the proposed method/rule-related parameter value of the present disclosure) may be specifically (or differently or independently) configured/allowed. In addition, in the present disclosure, "configuration" (or "designation") wording may be extended and interpreted as a form in which a base station informs a UE through a predefined (physical layer or higher layer) channel/signal (e.g., SIB, RRC, MAC CE) (and/or a form provided through pre-configuration and/or a form in which a UE informs other UEs through a predefined (physical layer or higher layer) channel/signal (e.g., SL MAC CE, PC5 RRC)), etc. In addition, in this disclosure, the "PSFCH" wording may be extended and interpreted as "(NR or LTE)

PSSCH (and/or (NR or LTE) PSCCH) (and/or (NR or LTE) SL SSB (and/or UL channel/signal))". And, the methods proposed in the present disclosure may be used in combination with each other (in a new type of manner).

For example, the term "specific threshold" below may refer to a threshold value defined in advance or (pre-) configured by a higher layer (including an application layer) of a network, a base station, or a UE. Hereinafter, the term "specific configuration value" may refer to a value defined in advance or (pre-)configured by a higher layer (including an application layer) of a network, a base station, or a UE. Hereinafter, "configured by a network/base station" may mean an operation in which a base station configures (in advance) a UE by higher layer RRC signaling, configures/ signals a UE through MAC CE, or signals a UE through DCI.

Hereinafter, PPS (or PBPS) means periodic-based partial sensing, and may mean an operation of performing sensing for a resource of a time point that precedes a resource by an integer multiple (k) of each period based on periods of a specific configuration value number when sensing for resource selection is performed. For example, the periods may be a period of the transmission resource configured in a transmission pool, a resource of a time point that precedes the time point of the candidate resource which is a target for determining resource collision in time by an integer multiple (k value) of each period, may be sensed, the k value may be configured in a form of a bitmap.

Hereinafter, CPS may mean continuous partial sensing, and may mean an operation of sensing all or a part of a time domain given as a specific configuration value. For example, CPS may include a short-term sensing (STS) operation in which sensing is performed for a relatively short period. Hereinafter, "partial sensing" may include the PPS operation or the CPS operation.

Hereinafter, partial sensing may mean a partial sensing including the PPS operation and/or the CPS operation.

For example, hereafter REV may refer to resource re-evaluation, and PEC may refer to resource pre-emption checking.

For example, a "candidate resource/slot" may refer to a resource that is selected to detect a resource conflict within a resource selection window when transmission resource selection is first triggered to transmit an arbitrary packet, and a resource selection window is selected to perform partial sensing. For example, "available resource/slot" may refer to a resource that is reported from the PHY layer to the MAC layer based on the above partial sensing as being available for transmission because no resource collisions are detected among the candidate resources. For example, "transmission resource/slot" refers to a resource that is finally selected by the MAC layer for use in SL transmission among the above reported resources.

According to one embodiment of the present disclosure, when a power saving UE performs SL DRX operation and simultaneously performs resource allocation based on partial sensing, a transmitting UE performing the operation may select a transmission resource considering an SL DRX configuration of a receiving UE as follows.

Within an on-duration or active duration of a receiving UE, a transmitting UE may perform an initial transmission and some retransmissions for a packet to be transmitted, expect the receiving UE to extend the active interval of the receiving UE based on the initial transmission and some retransmissions, and perform the remaining retransmissions except for the initial transmission and the some retransmissions in the expected extended active interval.

According to one embodiment of the present disclosure, when a receiving UE extends an SL discontinuous reception (DRX) active time duration based on a retransmission timer or the like when it receives an SCI, such that the time point of the next retransmission resource is included in the extended active time duration so that the retransmission can be received, a transmitting UE may determine, based on HARQ feedback for a PSCCH/PSSCH transmitting the SCI, whether the receiving UE has extended the active time duration based on the reception of the SCI. In this case, if the HARQ feedback for the PSCCH/PSSCH transmitted by the transmitting UE is not received, the transmitting UE may determine that a DTX has occurred in which the receiving UE does not receive the PSCCH/PSSCH, and thus determine that the active time duration of the receiving UE has not been extended. For example, in the above case, the MAC layer of the transmitting UE may trigger resource reselection for the next retransmission resource such that the time point of the retransmission resource is included within the active time duration of the receiving UE at that time.

According to one embodiment of the present disclosure, if a resource that has been reselected to be included in the active time duration of the receiving UE due to the DTX of the receiving UE as described above requires resource reselection to be performed once again, such as by re-evaluation (REV)/pre-emption checking (PEC), the transmitting UE may reselect the retransmission resource so that the reselected resource is included in the active time duration of the receiving UE. For example, if a resource that has been reselected so that the retransmission resource is included in the active time duration of the receiving UE due to the DTX of the receiving UE needs to be reselected once again by REV/PEC or the like, and the reselected resource cannot be selected within the active time duration, the transmitting UE may drop the transmission of the packet that was intended to be transmitted over the retransmission resource.

Figure 8:
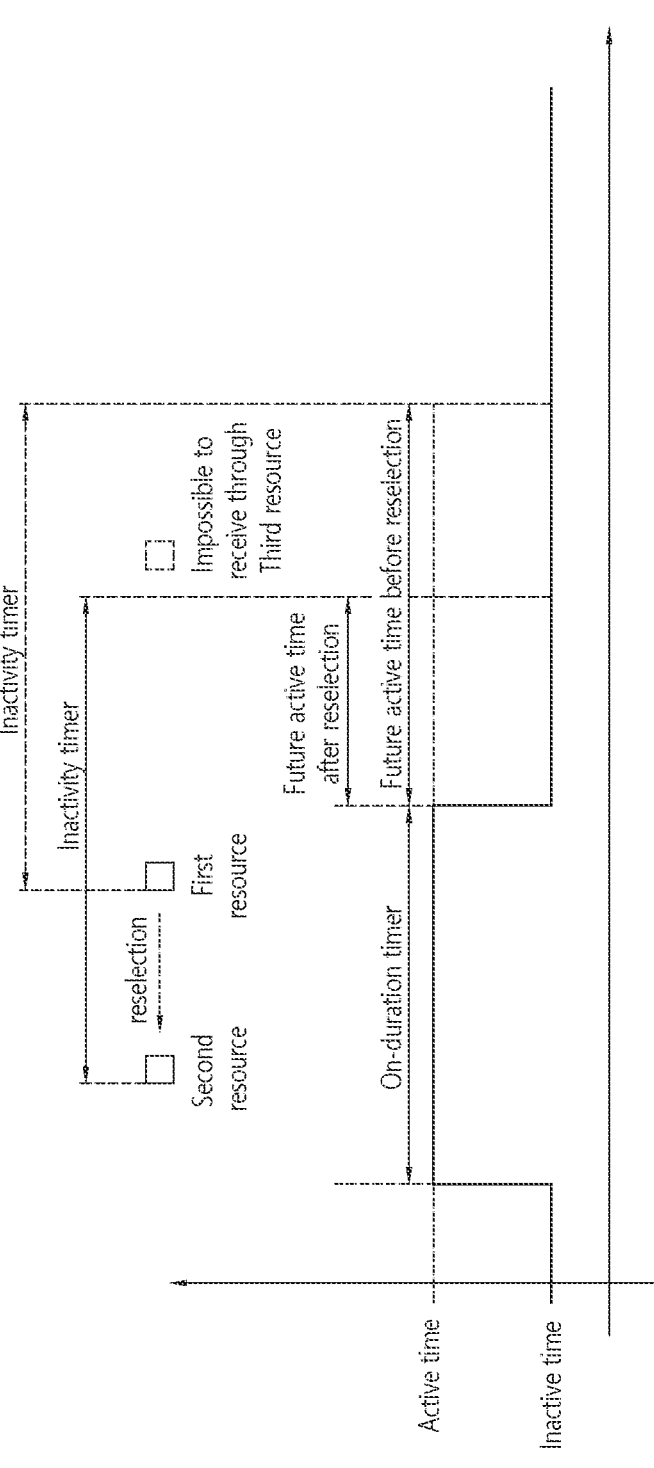
FIG. 8 shows a problem that may occur when a transmitting UE performs resource reselection according to prior art.

FIG. 8 shows a problem that may occur when a transmitting UE performs resource reselection according to prior art.

Referring to FIG. 8, a first resource and a third resource selected by a transmitting UE to perform SL transmission to a receiving UE are shown, and an active time and an inactive time based on an SL DRX configuration of the receiving UE are shown. For example, the active time may include an on-duration timer operation interval and an operation interval of a timer related to an active time of the SL DRX configuration. For example, an operation interval of the timer related to an active time that is running at the time point of the resource selection (first resource, third resource) may be a current active time, and an interval that is to be extended by a transmission performed based on the selected resource based on the resource selection (which is an inactive time at the time of the resource selection, but is expected to be extended to an active time in the future) may be a future active time.

For example, when a transmitting UE needs to perform a resource reselection from a first resource for reasons such as resource re-evaluation or prioritization, if the transmitting UE reselects the first resource to a second resource, the active time of the receiving UE that would have been extended by the transmission performed based on the first resource may be reduced as shown in FIG. 8. As a result, the third resource that was included in the future active time at the time point of resource selection may not be included in the active time, and thus the receiving UE may not be able to receive the transmission based on the third resource. Below, embodiments are proposed to address the above-mentioned problems, which are proposed in the present disclosure.

Figure 9:
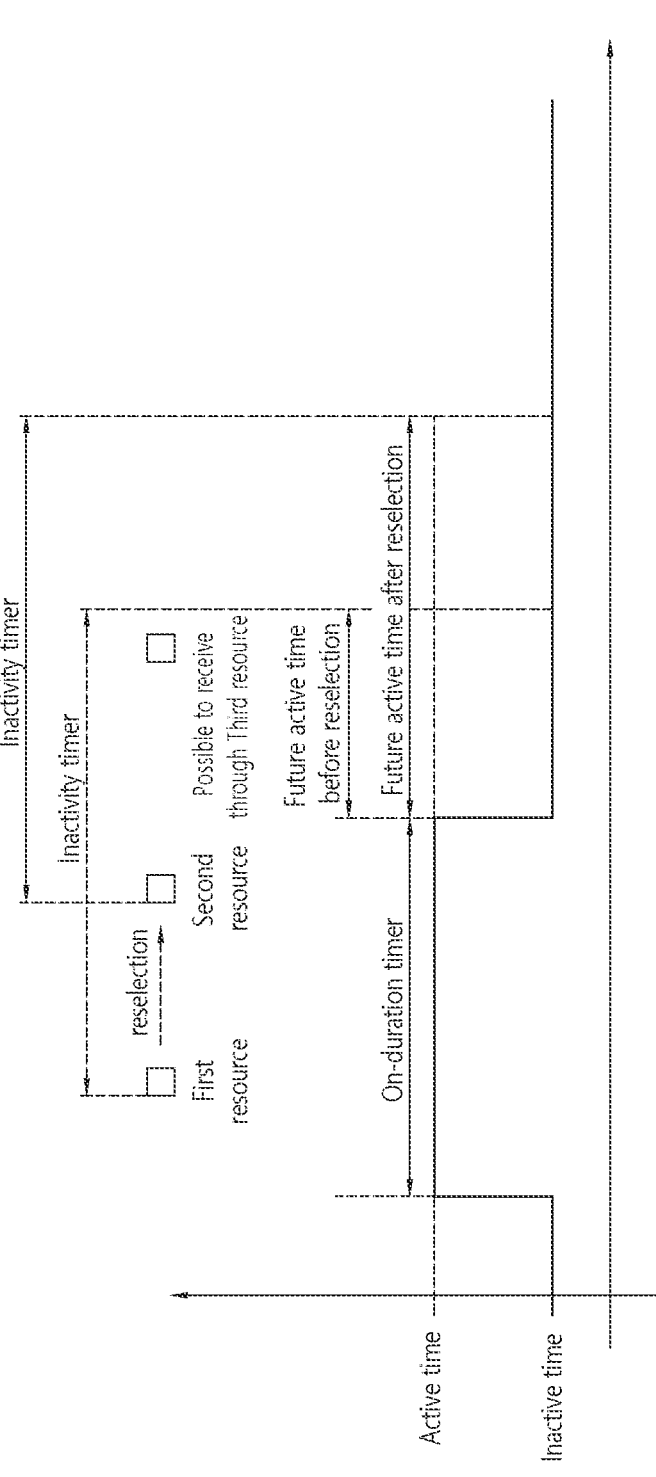
FIG. 9 shows an embodiment for addressing a problem caused by resource reselection of a transmitting UE, according to one embodiment of the present disclosure.

FIG. 9 shows an embodiment for addressing a problem caused by resource reselection of a transmitting UE, according to one embodiment of the present disclosure. The embodiment of FIG. 9 may be combined with various embodiments of the present disclosure.

Referring to FIG. 9, a first resource and a third resource selected by a transmitting UE to perform an SL transmission to a receiving UE as in FIG. 8 are shown, and an active time and an inactive time according to an SL DRX configuration of a receiving UE are shown. For example, when the transmitting UE needs to perform a resource reselection from the first resource for reasons such as resource re-evaluation or prioritization, the transmitting UE may reselect the first resource to a second resource. In other words, the transmitting UE may reselect the resource so that, when performing the resource reselection, the active time to be extended by the transmission performed based on the newly reselected resource (second resource) includes the already selected resource (third resource). That is, for example, the resource after the resource before the reselection may be newly reselected. As a result, the active time to be extended by the transmission performed based on the newly reselected second resource (future active time) may include the already selected third resource, thereby solving the problem described above.

According to one embodiment of the present disclosure, if an interval between transmission resources selected by a transmitting UE is greater than a retransmission timer value of a receiving UE, such that the retransmission resource following the preceding transmission resource is not included or is not expected to be included within an active time duration extended by the receiving UE based on the SCI received over the preceding transmission resource, or, if the resource reservation interval value signaled via SCI is set to zero (i.e., a retransmission resource is selected that is separated by an interval greater than the maximum interval between resources that may be signaled via SCI), the transmitting UE may determine that the retransmission through the retransmission resource will not be received by the receiving UE within the extended active time duration, and may perform resource reselection for the retransmission resource. For example, in the case described above, the MAC layer of the transmitting UE may trigger resource reselection for the next retransmission resource such that the time point of the retransmission resource is included within the active time duration of the receiving UE at that time.

According to one embodiment of the present disclosure, a transmitting UE may select only initial transmission and/or retransmission resources up to a specific threshold number for packets to be transmitted within an on-duration or active time duration of a receiving UE in order to reduce power consumption as much as possible. For example, if the transmitting UE selects only initial transmission resources, if the HARQ feedback is enabled in the resource pool, and if the transmitting UE transmits a MAC PDU with HARQ feedback enabled, the transmitting UE may configure additional retransmission resources based on the results of the HARQ feedback for the initial transmission.

For example, the transmitting UE may select a retransmission resource within the on-duration or active time duration of the receiving UE, or within the active time duration of the receiving UE extended based on the initial transmission, only upon receiving a HARQ NACK. For example, if the transmitting UE has received a HARQ ACK, the transmitting UE may release all previously selected retransmission resources, and if the transmitting UE has not received HARQ feedback (in the case of DTX), and if additional retransmission resources can be selected within the receiving UE's on-duration or active time duration, the transmitting UE may select a retransmission resource to perform a retransmission of the initial transmission. If no additional retransmission resource can be selected within the on-duration or active time duration of the receiving UE (e.g., if the time point at which the HARQ feedback is received is later than the on-duration or active time duration of the receiving UE, or if no available resources remain within the on-duration or active time duration of the receiving UE), then the transmitting UE may drop the transmission for the packet.

According to one embodiment of the present disclosure, if no additional retransmission resources can be selected within the on-duration or active time duration of the receiving UE as described above, a transmitting UE may utilize resources within an exceptional resource pool to perform the retransmission of the intended packet. For example, if no additional retransmission resource can be selected within the on-duration or active time duration of the receiving UE as described above, a transmitting UE may transmit the packet through a resource within the UE common and service common SL DRX on-duration configured in the resource pool.

According to one embodiment of the present disclosure, while a transmitting UE is in the process of transmitting a packet A related to one SL process, or in the process of selecting a resource that transmitted the packet A, and is about to transmit a packet B linked to another SL process, the transmitting UE may select resources for transmitting the packet A and the packet B within the on-duration or active time duration of a receiving UE. For example, a transmitting UE may select resources for transmitting the packet A within the on-duration or active time duration of a receiving UE, and may select resources for transmitting the packet B within an extended active time duration of the receiving UE that will be extended through an inactivity timer after the receiving UE receives the PSCCH/PSSCH transmitting the packet A. In the above cases, for example, the transmitting UE may select resources for transmitting the packet B within the on-duration or active time duration of the receiving UE. In the above case, for example, if the transmitting UE has received HARQ feedback for the packet A, the UE may retain the selected resource for transmitting the packet B, and if the transmitting UE has not received HARQ feedback for the packet A (in the case of DTX), the MAC layer of the transmitting UE may trigger resource reselection for the transmission resource for transmitting the packet B, and reselect a resource for transmitting the packet B within the on-duration or active time duration of the receiving UE.

According to one embodiment of the present disclosure, when a power saving UE performs SL DRX operation and simultaneously performs partial sensing based resource allocation, and a transmitting UE has reserved periodic resources for periodic transmissions, and DTX occurs for a transmission over a resource belonging to any period, the power saving UE may retransmit the packet that was intended to be transmitted over the resource belonging to the period in which the DTX occurred, over a reserved resource belonging to the next period, without reselecting a retransmission resource to be included within the on-duration or active time duration of the receiving UE through resource reselection as described above.

According to one embodiment of the present disclosure, a transmitting UE may select a resource for transmitting a packet (from the transmitting UE to a receiving UE) such that a PSFCH resource on which the receiving UE will transmit HARQ feedback for the packet it transmitted is within an SL DRX on-duration or active time duration of the transmitting UE. If, for example, the PSFCH resource is not within the SL DRX on-duration or active time duration of the transmitting UE, the MAC layer of the transmitting UE may trigger resource reselection for the transmission resource to reselect a transmission resource such that the PSFCH resource is within the SL DRX on-duration or active time duration of the transmitting UE, or may extend the SL active time duration of the transmitting UE itself by a specific setting value so that the PSFCH resource is within the extended SL active time duration.

According to one embodiment of the present disclosure, a transmitting UE, within a group performing groupcast option 1 (NACK-only feedback) or option 2 (UEs in the group transmit HARQ ACK/NACK, respectively), may select a transmission resource for groupcast considering a PSSCH-to-PSFCH resource mapping relationship such that all PSFCHs to be received from group members after the transmitting UE transmits a packet are included in the SL DRX on-duration or active time duration that is configured common to the group. If, for example, a part or all of PSFCH resources are not included within the DRX on-duration or active time duration, the MAC layer of a transmitting UE may trigger resource reselection for the transmission resource to reselect a transmission resource such that the all of PSFCH resources are included within an on-duration or an active time duration of the transmitting UE, or the transmitting UE may extend an SL DRX active time duration which only a transmitting UE uses, by a specific setting value, so that the all of PSFCHs can be received. For example, if a transmitting UE does not receive PSFCHs above a specific threshold number/percentage of the number of members in the group, the MAC layer of the transmitting UE may trigger resource reselection for the transmission resource to reselect a transmission resource such that all of the PSFCH resources are included within an on-duration or an active time duration of the transmitting UE, or the transmitting UE may extend an SL DRX active time duration which only the transmitting UE uses by a specific setting value, so that all of the PSFCHs can be received.

For example, an active time duration extension interval configured by an SL DRX configuration may be a specific setting value defined in units such as logical slots or physical slots or absolute time (e.g., ms). For example, the active time duration extension interval may be a specific value set by the network or a higher layer to one value from a set of specific setting values. For example, the active time duration extension interval may be a specific value set to one value by the network or higher layer from a set of values determined by a UE capability, wherein the UE reports the value of the active time duration extension interval (linked to the UE capability) to a base station, and the values belonging to the set that are set to the UE may include the value reported to the base station as the UE capability.

For example, the active time duration extension interval may be a maximum time interval between any two reserved resources that can be signaled in single SCI, or a value greater than or equal to the maximum time interval. For example, the active time duration extension interval may be the time delay to retransmission resource (TDRA) or resource reservation period (RSVP) value included in the received SCI, or may be a value greater than or equal to the interval (TDRA) or resource reservation period (RSVP) value. For example, the active time duration extension interval may be a time interval until the retransmission resource included in the received SCI (to a receiving UE) (TDRA) or a resource reservation period (RSVP) value or a value greater than or equal to the interval (TDRA) or resource reservation period (RSVP) value.

According to one embodiment of the present disclosure, an initial transmission resource and a specific configured number of retransmission resources for one packet transmission are selected within an SL DRX on-duration of the receiving UE, and the remaining retransmission resources for the packet transmission are selected within an SL DRX off-duration of the receiving UE, in order to ensure that the active time duration of the receiving UE includes the next retransmission resource through the transmission of the on-duration, the interval between the last transmission resource of the on-duration and the first transmission resource of the off-duration may be configured to be less than or equal to a specific threshold value. For example, the specific threshold value may be the active time duration extension interval. For example, the interval between the retransmission resources selected within an off-duration may be configured to be less than or equal to a specific threshold value, such that a receiving UE can receive the next retransmission with an active time duration extension as described above. For example, resource selection may be performed such that a specific configuration number of retransmission resources are included within the specific threshold time interval.

According to one embodiment of the present disclosure, when a transmitting UE receives a HARQ NACK from a receiving UE for a packet transmitted by the transmitting UE, and the transmitting UE's next retransmission resource is not within the receiving UE's SL DRX on-duration or active time duration at that time, or an expected extended active time duration in the future, the transmitting UE may perform the following operations.

1. when a transmitting UE operates in SL resource allocation mode-1, the transmitting UE may be allocated a retransmission DG resource by reporting the HARQ NACK to a base station, requesting an additional retransmission resource within the on-duration or active time duration of the receiving UE at that time point, or within an expected extended active time duration in the future. For example, for the above operation, the transmitting UE may report an SL DRX configuration to the base station, including an extended active time duration interval, after completing the configuration for the SL DRX configuration with the receiving UE.

2. when a transmitting UE operates in SL resource allocation mode-2, the transmitting UE may select additional retransmission resources based on partial sensing results within the extended active time duration. For example, the transmitting UE may select an additional retransmission resource based on random resource selection within the extended active time duration. For example, the transmitting UE may trigger a resource reselection for an existing retransmission resource to reselect the existing retransmission resource to a resource that is included within the extended active time duration.

3. For example, if a transmitting UE is unable to select an additional resource within the extended active time duration of a receiving UE, the transmitting UE may drop the transmission of the packet, or may transmit the packet using a transmission resource from an exceptional pool or a specific (pre)configured resource pool or a specific interval.

According to one embodiment of the present disclosure, if a receiving UE wakes up and attempts to receive at a time point when the retransmission is expected, based on resource reservation information for the next retransmission resource included in previously received SCI, but does not receive the expected retransmission, the receiving UE may determine that a transmitting UE has reselected the reserved retransmission resource, and extend the active time duration of the receiving UE by the active time duration extension interval.

According to one embodiment of the present disclosure, if a receiving UE has not received the expected retransmission at the time point of the expected retransmission due to half duplex problem caused by other UL transmission or SL transmission, or has dropped reception for the expected retransmission due to other UL reception or an SL reception, the receiving UE may extend the active time duration of the receiving UE by the active time duration extension interval.

According to one embodiment of the present disclosure, if a transmitting UE fails to perform the expected (re) transmission due to a half-duplex problem caused by another UL reception or SL reception at any (re)transmission time point for one packet, or fails to perform the expected (re)transmission due to another UL reception or an SL transmission, in order to avoid the case when the earliest retransmission time point after the (re)transmission is not included within the on-duration or active time duration of the receiving UE at that time point, 1. if the transmitting UE is a power-saving UE that performs a transmission by performing resource allocation based on partial sensing under SL DRX operation, the transmitting UE may set the priority value for the transmission to be lower than a specific threshold value, or may reduce the priority value by a specific setting value to reduce the probability that the transmission is dropped on a priority basis.

2. if the transmitting UE performs SL resource allocation mode-1 operation, the transmitting UE may transmit using another DG resource or CG resource of the transmitting UE, or if the transmitting UE performs SL resource allocation mode-2 operation, the transmitting UE may transmit using another dynamic resource or SPS resource of the transmitting UE.

3. The transmitting UE may drop the transmission for that packet in the case described above.

According to one embodiment of the present disclosure, when a receiving UE fails to receive for a (re)transmission of one packet and thus fails to transmit HARQ feedback to a transmitting UE, or when a transmitting UE fails to receive a PSFCH transmitted by a receiving UE due to another PSFCH reception, or a transmitting UE fails to receive a PSFCH transmitted by the receiving UE due to the transmitting UE transmitting its own PSFCH (half duplex), the transmitting UE may determine that the above case is a DTX and trigger resource reselection for the next retransmission resource to select the reselection resource within the on-duration or active time duration of the receiving UE at that time, point. Alternatively, for example, the transmitting UE may determine that the above case is a NACK and, if the next retransmission resource does not exist within the expected extended active time duration of the receiving UE, trigger resource reselection for the next retransmission resource to select the reselection resource within the expected extended active time duration of the receiving UE.

According to one embodiment of the present disclosure, when a receiving UE performs an SL DRX operation, and after selecting/reserving a plurality of transmission resources for communication with the receiving UE, and reselect a resource A of any one among the plurality of transmission resources by REV or PEC, etc., in order for an SL DRX active time duration, of a receiving UE extended based on the receiving UE receiving a transmission through a resource B (the transmitting UE reselects the resource A to the resource B) which is the reselected, to include the next retransmission resource C within a time region selected/reserved after the resource A among the plurality of transmission resources, the transmitting UE may select a reselection resource B for the resource A. For example, along with the condition described above, the reselection resource B may need to satisfy the condition of being included within an SL DRX active time duration of the receiving UE before the reselection operation. For example, the operation of selecting the reselection resource B such that the next transmission resource C to be included within the extended active time duration, may be limited to be performed only when the transmission resource C is transmitted as transmission reservation information through SCI transmitted by the transmitting UE. For example, when the transmission resource C is not transmitted as resource reservation information through the SCI transmitted by the transmitting UE (i.e. in the case of REV), the transmitting UE may select the reselection resource B in the range that satisfies only the condition of being included within the SL DRX active time duration of the receiving UE before the reselection operation, regardless of the time position of the transmission resource C.

According to one embodiment of the present disclosure, when a transmitting UE reselects the resource A to the resource B in the case described above, it may consider all active time durations extended based on the transmitting UE transmitting other TBs other than the TB it transmits to the receiving UE, including a TB that it intends to transmit through the resource A and/or resource B and/or resource C. For example, a transmitting UE may reselect the resource B such that the resource B is included within the all considered active time duration at the time point of reselection, and at the same time the resource C is included within the all considered active time duration, including the active time duration extended by the transmission over the resource B.

According to one embodiment of the present disclosure, in an SL DRX operation, the length of the extended active time duration that is extended based on the reception of any PSCCH/PSSCH is denoted as L, and when performing reselection for a selected/reserved resource, only resources within a specific threshold value R in the time domain from the selected/reserved resource may be selected as the reselected resource, and the maximum time interval between any transmission resources that may be selected/reserved by a UE is denoted as D. The L and/or R and/or D values may be configured/determined to satisfy, the following conditions.

$$D + 2*R \le L \qquad \text{[Equation 1]}$$

That is, for example, for any two neighboring transmission resources, if resource reselection is performed on one or both of the transmission resources based on REV or PEC or the like, the time interval between the reselected resources may be configured such that it is always less than or equal to the length of the extended active time duration. In this way, a receiving UE can be guaranteed to receive a transmission from a transmitting UE in the extended active time duration, regardless of whether the transmitting UE reselects resources or not.

According to one embodiment of the present disclosure, when a transmitting UE reselects the resource A to the resource B in the case described above, if the resource C is not included or is not expected to be included within a range that extends the active time duration of a receiving UE based on the receiving UE receiving through the resource B, the transmitting UE may reselect the transmission resource C to a transmission resource D that is included within the extended active time duration of the receiving UE based on the receiving UE receiving through the resource B. For example, the operation of reselecting the resource C to the transmission resource D that is included in the extended active time duration of the receiving UE may be limited to the case where the resource C is not transmitted as resource reservation information by SCI transmitted by a transmitting UE (i.e., limited to the case of REV).

According to various embodiments of the present disclosure, when a UE performing SL DRX operation selects a transmission resource based on partial sensing, it may be effective to adjust the resource time interval between the initial transmission and the retransmission to prevent the transmission probability from dropping due to missed reception of the retransmission.

According to the prior art, when a transmitting UE selects a plurality of resources that are included within the future active time according to an SL DRX configuration of a receiving UE, and a resource reselection is performed from a preceding resource among the plurality of resources, the time point of the later resource among the plurality of resources is out of the active time of the receiving UE.

According to an embodiment of the present disclosure, if a transmitting UE has performed resource selection considering a future active time of a receiving UE, even if resource reselection is performed from the selected resources, the already selected resources will not be outside the future active time, and thus the above problem may be solved.

FIG. 10 shows a procedure for a first device to perform wireless communication, according to one embodiment of the present disclosure. The embodiment of FIG. 10 may be combined with various embodiments of the present disclosure.

Referring to FIG. 10, in step S1010, a first device may obtain a sidelink (SL) discontinuous reception (DRX) configuration related to a second device. In step S1020, the first device may obtain information related to a resource pool. In step S1030, the first device may trigger resource selection for a transmission of a first medium access control (MAC) protocol data unit (PDU). In step S1040, the first device may determine a resource selection window for the resource selection in the resource pool. In step S1050, the first device may select a first resource and a second resource included within a first active time related to the SL DRX configuration, in the resource selection window. In step S1060, the first device may reselect the first resource to a third resource in the resource selection window. For example, the third resource may be a resource that causes the second resource to be included within a second active time. In step S1070, the first device may transmit, to the second device, first sidelink control information (SCI) for scheduling of a physical sidelink shared channel (PSSCH) through a physical sidelink control channel (PSCCH), based on the third resource. In step S1080, the first device may transmit, to the second device, the first MAC PDU through the PSSCH, based on the third resource. For example, the first active time may include a time when a timer related to an active time included in the SL DRX configuration would have run based on a reception performed based on the first resource, and the second active time may include a time during which the timer related to an active time runs based on a reception performed based on the third resource.

For example, the third resource may be later than the first resource.

For example, the second active time may include a time during which the timer related to an active time runs based on a reception of a second MAC PDU different from the first MAC PDU.

For example, additionally, the first device may transmit, to the second device, second SCI including information related to the second resource.

For example, the reselection may be performed based on a transmission of the second SCI.

For example, additionally, the first device may transmit, to the second device, second SCI including information related to the first resource.

For example, additionally, the first device may determine an occurrence of discontinuous transmission (DTX) based on a hybrid automatic repeat request (HARQ) feedback related to the second SCI being not able to be received from the second device. For example, the reselection may be performed based on the DTX.

For example, the reselection may be performed based on a resource reservation interval value of the second SCI being 0.

For example, the reselection may be performed based on a physical sidelink feedback channel (PSFCH) resource related to the second SCI being not included within a third active time of the first device.

For example, the reselection may be performed based on an interval between resources selected based on the resource selection being greater than a retransmission timer value of the SL DRX configuration.

For example, the first resource may be included within an on-duration timer duration of the SL DRX configuration, the second resource may be not included within the on-duration timer duration, and an interval between the first resource and the second resource may be less than or equal to a threshold value.

For example, the first resource may be a last resource included within the on-duration timer duration among resources selected based on the resource selection, and the second resource may be a first resource not included within the on-duration timer duration among the resources selected based on the resource selection.

For example, the timer related to an active time may be an SL DRX inactivity timer or an SL DRX retransmission timer.

The embodiments described above may be applied to various devices described below. First, a processor 102 of a first device 100 may obtain a sidelink (SL) discontinuous reception (DRX) configuration related to a second device 200. And, the processor 102 of the first device 100 may obtain information related to a resource pool. And, the processor 102 of the first device 100 may trigger resource selection for a transmission of a first medium access control (MAC) protocol data unit (PDU). And, the processor 102 of the first device 100 may determine a resource selection window for the resource selection in the resource pool. And, the processor 102 of the first device 100 may select a first resource and a second resource included within a first active time related to the SL DRX configuration, in the resource selection window. And, the processor 102 of the first device 10 may reselect the first resource to a third resource in the resource selection window. For example, the third resource may be a resource that causes the second resource to be included within a second active time. And, the processor 102 of the first device 100 may control a transceiver 106 to transmit, to the second device 200, first sidelink control information (SCI) for scheduling of a physical sidelink shared channel (PSSCH) through a physical sidelink control channel (PSCCH), based on the third resource. And, the processor 102 of the first device 100 may control the transceiver 106 to transmit, to the second device 200 the first MAC PDU through the PSSCH, based on the third resource. For example, the first active time may include a time when a timer related to an active time included in the SL DRX configuration would have run based on a reception performed based on the first resource, and the second active time may include a time during which the timer related to an active time runs based on a reception performed based on the third resource.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration related to a second device; obtain information related to a resource pool; trigger resource selection for a transmission of a first medium access control (MAC) protocol data unit (PDU); determine a resource selection window for the resource selection in the resource pool; select a first resource and a second resource included within a first active time related to the SL DRX configuration, in the resource selection window; reselect the first resource to a third resource in the resource selection window, wherein the third resource may be a resource that causes the second resource to be included within a second active time; transmit, to the second device, first sidelink control information (SCI) for scheduling of a physical sidelink shared channel (PSSCH) through a physical sidelink control channel (PSCCH), based on the third resource; and transmit, to the second device, the first MAC PDU through the PSSCH, based on the third resource, wherein the first active time may include a time when a timer related to an active time included in the SL DRX configuration would have run based on a reception performed based on the first resource, and wherein the second active time may include a time during which the timer related to an active time runs based on a reception performed based on the third resource.

For example, the third resource may be later than the first resource.

For example, the second active time may include a time during which the timer related to an active time runs based on a reception of a second MAC PDU different from the first MAC PDU.

For example, additionally, the first device may transmit, to the second device, second SCI including information related to the second resource.

For example, the reselection may be performed based on a transmission of the second SCI.

For example, additionally, the first device may transmit, to the second device, second SCI including information related to the first resource.

For example, additionally, the first device may determine an occurrence of discontinuous transmission (DTX) based on a hybrid automatic repeat request (HARQ) feedback related to the second SCI being not able to be received from the second device. For example, the reselection may be performed based on the DTX.

For example, the reselection may be performed based on a resource reservation interval value of the second SCI being 0.

For example, the reselection may be performed based on a physical sidelink feedback channel (PSFCH) resource related to the second SCI being not included within a third active time of the first device.

For example, the reselection may be performed based on an interval between resources selected based on the resource selection being greater than a retransmission timer value of the SL DRX configuration.

For example, the first resource may be included within an on-duration timer duration of the SL DRX configuration, the second resource may be not included within the on-duration timer duration, and an interval between the first resource and the second resource may be less than or equal to a threshold value.

For example, the first resource may be a last resource included within the on-duration timer duration among resources selected based on the resource selection, and the second resource may be a first resource not included within the on-duration timer duration among the resources selected based on the resource selection.

For example, the timer related to an active time may be an SL DRX inactivity timer or an SL DRX retransmission timer.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain a sidelink (SL) discontinuous reception (DRX) configuration related to a second UE; obtain information related to a resource pool; trigger resource selection for a transmission of a first medium access control (MAC) protocol data unit (PDU); determine a resource selection window for the resource selection in the resource pool, select a first resource and a second resource included within a first active time related to the SL DRX configuration, in the resource selection window; reselect the first resource to a third resource in the resource selection window, wherein the third resource may be a resource that causes the second resource to be included within a second active time; transmit, to the second UE, first sidelink control information (SCI) for scheduling of a physical sidelink shared channel (PSSCH) through a physical sidelink control channel (PSCCH), based on the third resource; and transmit, to the second UE, the first MAC PDU through the PSSCH, based on the third resource, wherein the first active time may include a time when a timer related to an active time included in the SL DRX configuration would have run based on a reception performed based on the first resource, and wherein the second active time may include a time during which the timer related to an active time runs based on a reception performed based on the third resource.

According to an embodiment of the present disclosure, a non-transitory computer-readable storage medium storing instructions may be proposed. For example, when executed, the instructions may cause a first device to: obtain a sidelink (SL) discontinuous reception (DRX) configuration related to a second device; obtain information related to a resource pool, trigger resource selection for a transmission of a first medium access control (MAC) protocol data unit (PDU); determine a resource selection window for the resource selection in the resource pool; select a first resource and a second resource included within a first active time related to the SL DRX configuration, in the resource selection window, reselect the first resource to a third resource in the resource selection window, wherein the third resource may be a resource that causes the second resource to be included within a second active time; transmit, to the second device, first sidelink control information (SCI) for scheduling of a physical sidelink shared channel (PSSCH) through a physical sidelink control channel (PSCCH), based on the third resource; and transmit, to the second device, the first MAC PDU through the PSSCH, based on the third resource, wherein the first active time may include a time when a timer related to an active time included in the SL DRX configuration would have run based on a reception performed based on the first resource, and wherein the second active time may include a time during which the timer related to an active time runs based on a reception performed based on the third resource.

FIG. 11 shows a procedure for a second device to perform wireless communication, according to one embodiment of the present disclosure. The embodiment of FIG. 11 may be combined with various embodiments of the present disclosure.

Referring to FIG. 11, in step S1110, a second device may obtain a sidelink (SL) discontinuous reception (DRX) configuration. In step S1120, the second device may receive, from a first device, first sidelink control information (SCI) for scheduling of a physical sidelink shared channel (PSSCH) through a physical sidelink control channel (PSCCH), based on an active time of the SL DRX configuration and a third resource. For example, the first SCI may include information related to a second resource. In step S1130, the second device may receive, from the first device, a first medium access control (MAC) protocol data unit (PDU) and second SCI through the PSSCH, based on the active time and the third resource. In step S1140, the second device may start a timer related to an active time of the SL DRX configuration based on the second SCI. For example, the second resource may be included within an interval during which the timer related to an active time of the SL DRX configuration being running, the third resource may be a resource reselected from a first resource, and the second resource may be included within a time when the timer related to an active time of the SL DRX configuration would have run based on a reception performed based on the first resource.

For example, the third resource may be later than the first resource.

The embodiments described above may be applied to various devices described below. First, a processor 202 of a second device 200 may obtain a sidelink (SL) discontinuous reception (DRX) configuration. And, the processor 202 of the second device 200 may control a transceiver 206 to receive, from a first device 100, first sidelink control information (SCI) for scheduling of a physical sidelink shared channel (PSSCH) through a physical sidelink control channel (PSCCH), based on an active time of the SL DRX configuration and a third resource. For example, the first SCI may include information related to a second resource. And, the processor 202 of the second device 200 may control the transceiver 206 to receive, from the first device 100, a first medium access control (MAC) protocol data unit (PDU) and second SCI through the PSSCH, based on the active time and the third resource. And, the processor 202 of the second device 200 may start a timer related to an active time of the SL DRX configuration based on the second SCI. For example, the second resource may be included within an interval during which the timer related to an active time of the SL DRX configuration being running, the third resource may be a resource reselected from a first resource, and the second resource may be included within a time when the timer related to an active time of the SL DRX configuration would have run based on a reception performed based on the first resource.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration; receive, from a first device, first sidelink control information (SCI) for scheduling of a physical sidelink shared channel (PSSCH) through a physical sidelink control channel (PSCCH), based on an active time of the SL DRX configuration and a third resource, wherein the first SCI may include information related to a second resource; receive, from the first device, a first medium access control (MAC) protocol data unit (PDU) and second SCI through the PSSCH, based on the active time and the third resource, and start a timer related to an active time of the SL DRX configuration based on the second SCI, wherein the second resource may be included within an interval during which the timer related to an active time of the SL DRX configuration being running, wherein the third resource may be a resource reselected from a first resource, and wherein the second resource may be included within a time when the timer related to an active time of the SL DRX configuration would have run based on a reception performed based on the first resource.

For example, the third resource may be later than the first resource.

Various embodiments of the present disclosure may be combined with each other.

Devices to which various embodiments of the present disclosure may be applied are described below.

Although not limited thereto, the various descriptions, features, procedures, suggestions, methods, and/or flowcharts of operation disclosed herein may be applied to various fields requiring wireless communication/connectivity (e.g., 5G) between devices.

Hereinafter, it is more specifically described with reference to the drawings. In the following drawings/descriptions, the same drawing symbols may refer to the same or corresponding hardware blocks, software blocks, or functional blocks, unless otherwise indicated.

Figure 12:
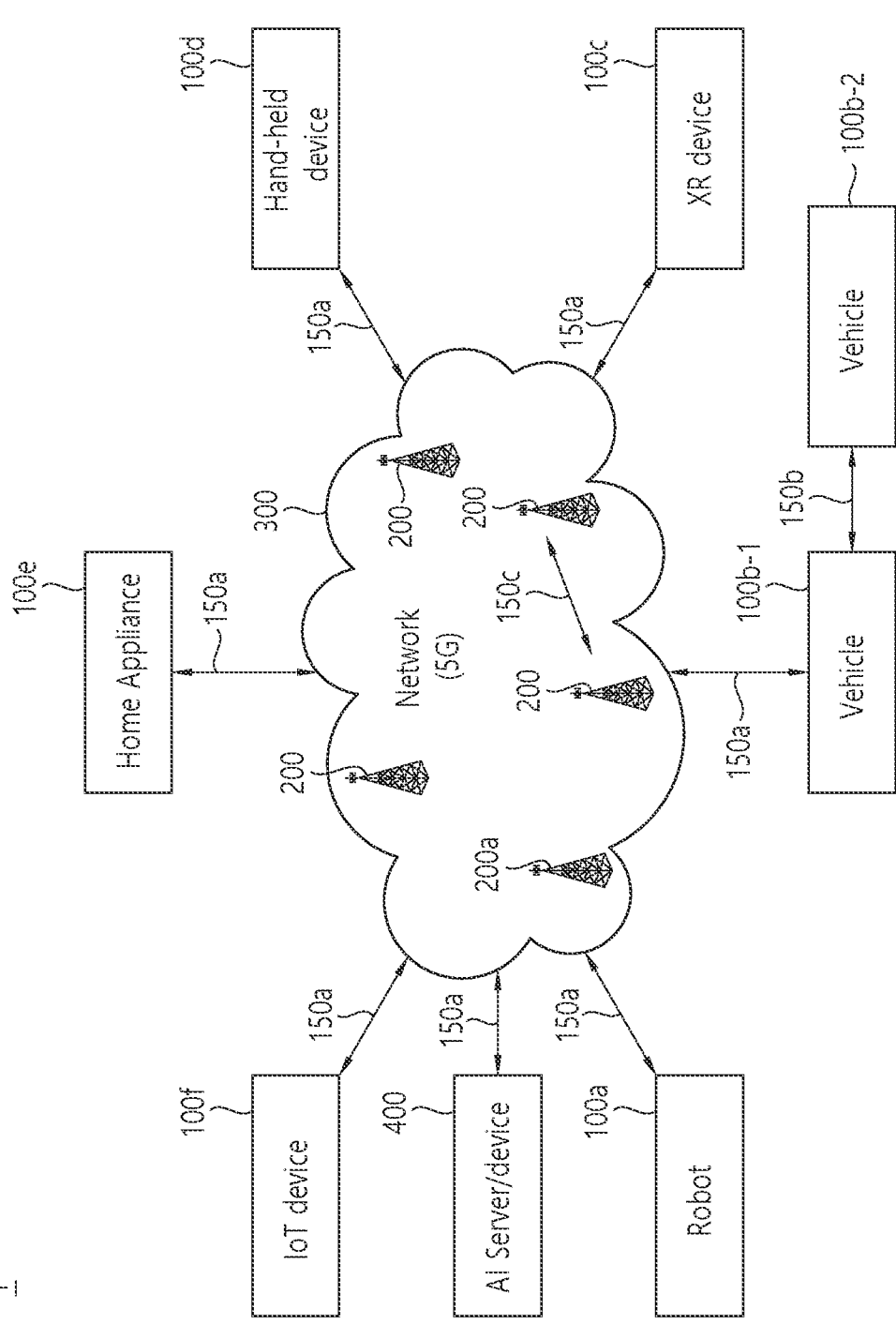
FIG. 12 shows a communication system 1, based on an embodiment of the present disclosure.

FIG. 12 shows a communication system 1, based on an embodiment of the present disclosure. The embodiment of FIG. 12 may be combined with various embodiments of the present disclosure.

Referring to FIG. 12, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE)network, or a 5G (e.g., NR) network. Although the wireless devices 100*a* to 100*f* may communicate with each other through the BSs 200/ network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Ve-hicle-to-every thing (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink com-munication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communi-cation/connections 150*a* and 150*b*. For example, the wire-less communication/connections 150*a* and 150*b* may trans-mit/receive signals through various physical channels. To this end, at least a part of various configuration information configuring processes, various signal processing processes (e.g., channel encoding/decoding, modulation/demodula-tion, and resource mapping/demapping), and resource allo-cating processes, for transmitting/receiving radio signals, may be performed based on the various proposals of the present disclosure.

Figure 13:
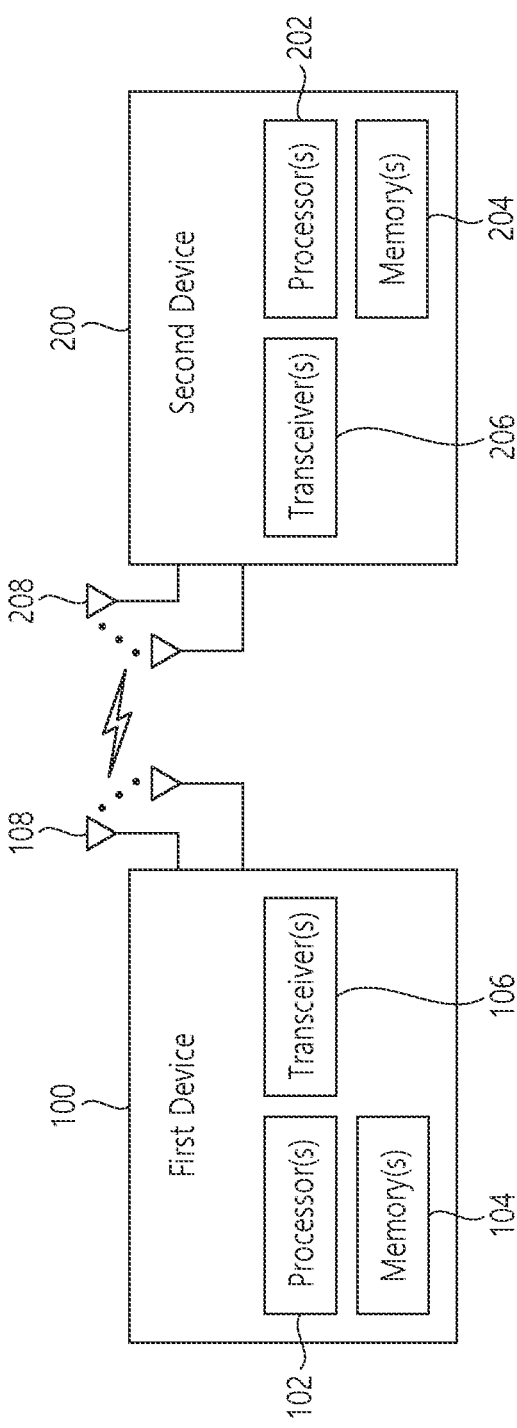
FIG. 13 shows wireless devices, based on an embodiment of the present disclosure.

FIG. 13 shows wireless devices, based on an embodiment of the present disclosure. The embodiment of FIG. 13 may be combined with various embodiments of the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 12.

The first wireless device 100 may include one or more processors 102 and one or more memories 104 and addi-tionally further include one or more transceivers 106 and/or one or more antennas 108. The processor(s) 102 may control the memory(s) 104 and/or the transceiver(s) 106 and may be configured to implement the descriptions, functions, proce-dures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be inter-changeably used with Radio Frequency (RF) unit(s). In the present disclosure, the wireless device may represent a communication modem/circuit/chip.

The second wireless device 200 may include one or more processors 202 and one or more memories 204 and addi-tionally further include one or more transceivers 206 and/or one or more antennas 208. The processor(s) 202 may control the memory(s) 204 and/or the transceiver(s) 206 and may be configured to implement the descriptions, functions, proce-dures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be inter-changeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY. MAC, RLC, PDCP. RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flow-charts disclosed in this document. The one or more proces-sors 102 and 202 may generate messages, control informa-tion, data, or information according to the descriptions, functions, procedures, proposals, methods, and/or operational flowcharts disclosed in this document. The one or more processors 102 and 202 may generate signals (e.g., baseband signals) including PDUs. SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
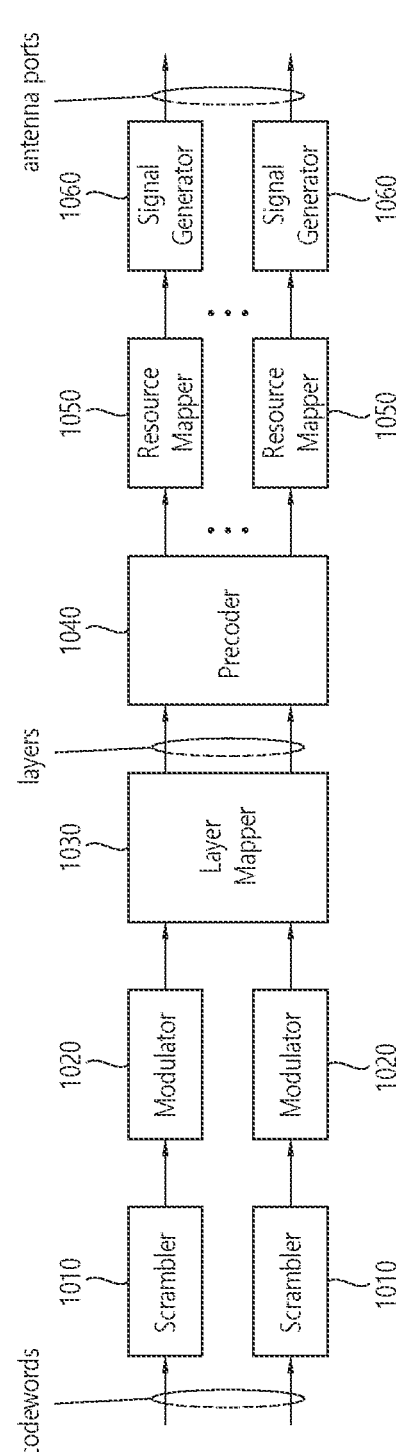
FIG. 14 shows a signal process circuit for a transmission signal, based on an embodiment of the present disclosure.

FIG. 14 shows a signal process circuit for a transmission signal, based on an embodiment of the present disclosure. The embodiment of FIG. 14 may be combined with various embodiments of the present disclosure.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG. 13.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W.

Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 15:
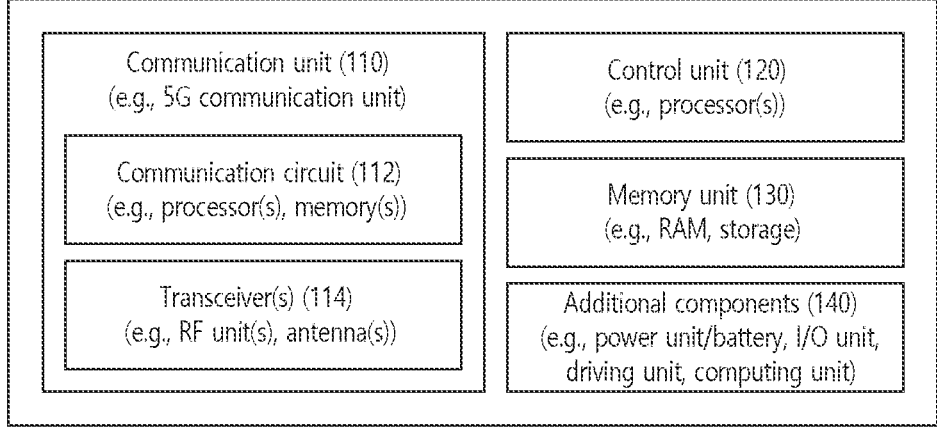
FIG. 15 shows another example of a wireless device, based on an embodiment of the present disclosure.

FIG. 15 shows another example of a wireless device, based on an embodiment of the present disclosure. The wireless device may be implemented in various forms according to a use-case/service (refer to FIG. 12). The embodiment of FIG. 15 may be combined with various embodiments of the present disclosure.

Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 12), the vehicles (100*b*-1 and 100*b*-2 of FIG. 12), the XR device (100*c* of FIG. 12), the hand-held device (100*d* of FIG. 12), the home appliance (100*e* of FIG. 12), the IoT device (100*f* of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 15 will be described in detail with reference to the drawings.

Figure 16:
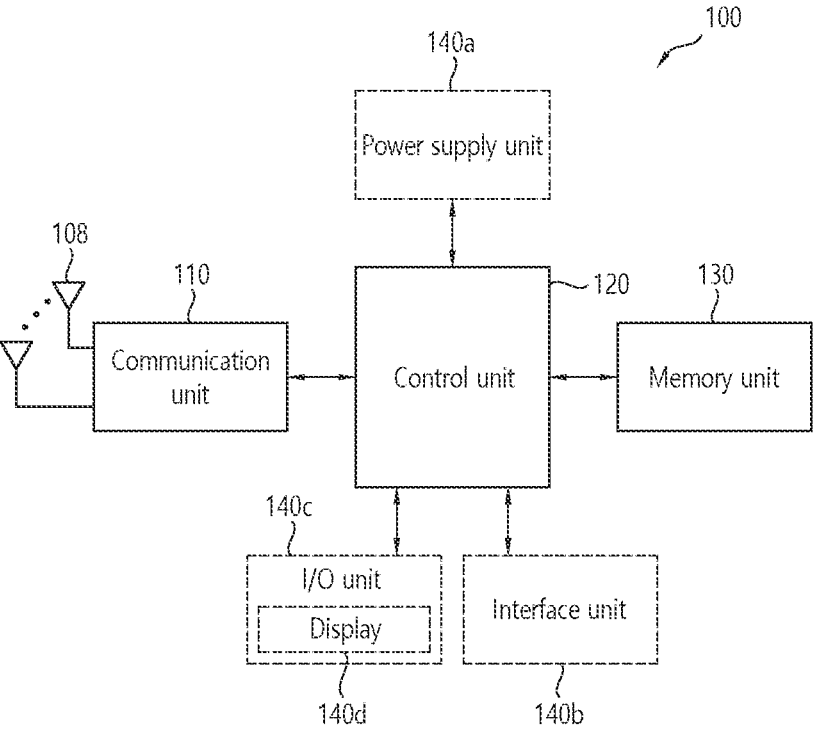
FIG. 16 shows a hand-held device, based on an embodiment of the present disclosure.

FIG. 16 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 16 may be combined with various embodiments of the present disclosure.

Referring to FIG. 16, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 17:
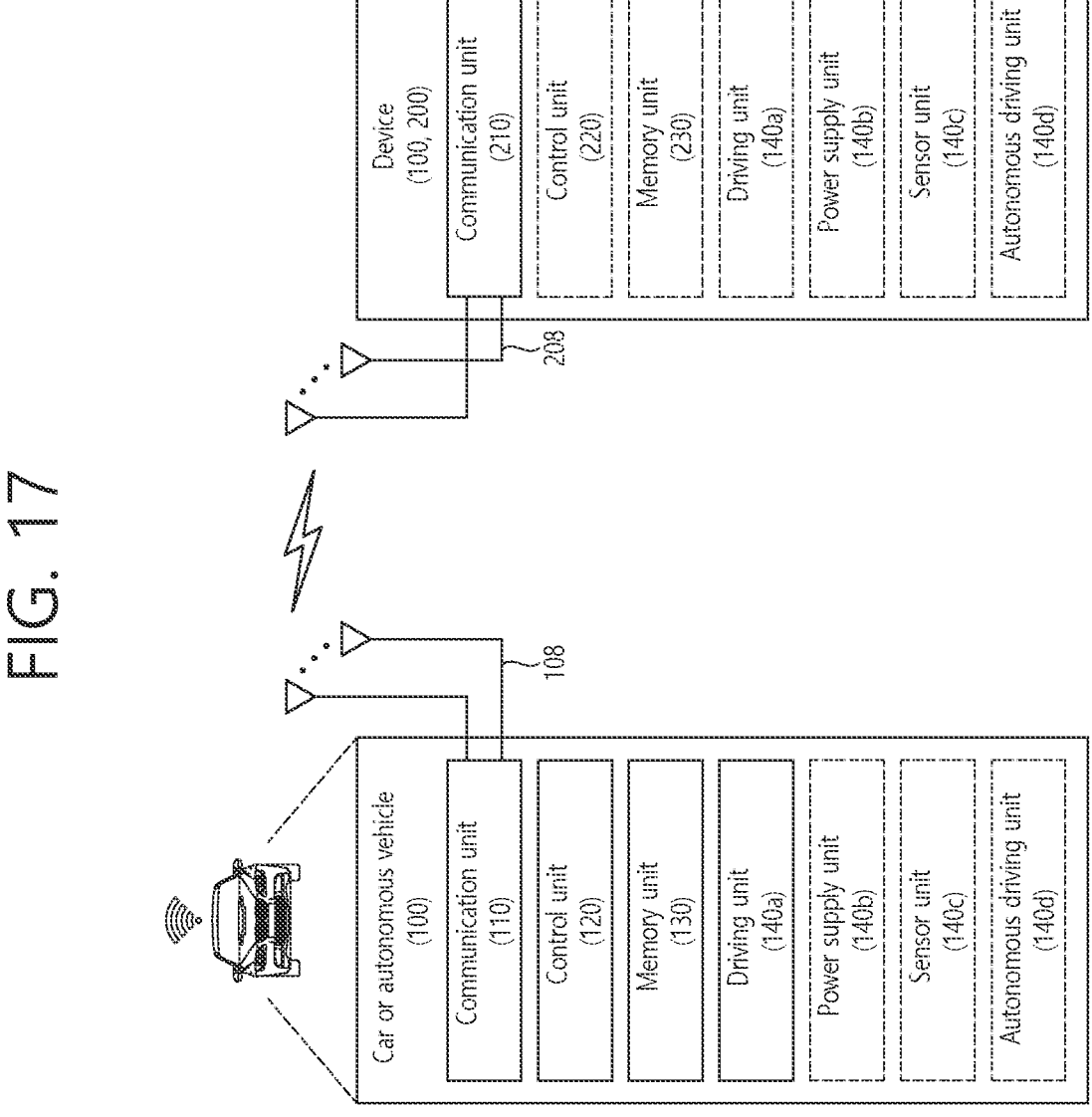
FIG. 17 shows a vehicle or an autonomous vehicle, based on an embodiment of the present disclosure.

FIG. 17 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 17 may be combined with various embodiments of the present disclosure.

Referring to FIG. 17, a vehicle or autonomous vehicle 10 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:

obtaining a sidelink (SL) discontinuous reception (DRX) configuration related to a second device;

selecting a first resource included within a first active time related to the SL DRX configuration, for a transmission of a first medium access control (MAC) protocol data unit (PDU), wherein the first active time includes a time during which a timer started based on a time of the first resource is running;

transmitting, to the second device, first sidelink control information (SCI) including information related to the first resource; and reselecting the first resource to a third resource after the first resource within the first active time, based on pre-emption for the first resource.

2. The method of claim 1, wherein a second resource included within the first active time is selected along with the first resource, wherein the second resource is included within a second active time related to the SL DRX configuration and the first active time, and wherein the second active time includes a time during which a timer started based on a time of the third resource is running.

3. The method of claim 2, further comprising:
transmitting, to the second device, second SCI including information related to the second resource.

4. The method of claim 3, wherein the reselection is performed based on a transmission of the second SCI.

5. The method of claim 1, wherein the first active time includes a time during which a timer related to an active time of the SL DRX configuration is running based on a reception of a second MAC PDU different from the first MAC PDU.

6. The method of claim 1, further comprising:
transmitting, to the second device, second SCI for scheduling of a physical sidelink shared channel (PSSCH) through a physical sidelink control channel (PSCCH), based on the third resource; and
transmitting, to the second device, the first MAC PDU through the PSSCH, based on the third resource.

7. The method of claim 1, further comprising:
determining an occurrence of discontinuous transmission (DTX) based on a hybrid automatic repeat request (HARQ) feedback related to the first SCI being not able to be received from the second device,
wherein the reselection is performed based on the DTX.

8. The method of claim 1, wherein the reselection is performed based on a resource reservation interval value included in the first SCI being 0.

9. The method of claim 1, wherein the reselection is performed based on a physical sidelink feedback channel (PSFCH) resource related to the first SCI being not included within a third active time of the first device.

10. The method of claim 1, wherein the reselection is performed based on an interval between resources selected based on the resource selection related to the first resource being greater than a retransmission timer value of the SL DRX configuration.

11. The method of claim 1, wherein a second resource included within the first active time is selected along with the first resource,
wherein the first resource is included within an on-duration timer duration of the SL DRX configuration,
wherein the second resource is not included within the on-duration timer duration, and
wherein an interval between the first resource and the second resource is less than or equal to a threshold value.

12. The method of claim 11, wherein the first resource is a last resource included within the on-duration timer duration among resources selected based on the resource selection related to the first resource and the second resource, and
wherein the second resource is a first resource not included within the on-duration timer duration among the resources selected based on the resource selection.

13. The method of claim 1, wherein the SL DRX configuration includes information for a timer related to an active time, and
wherein the timer related to an active time includes an SL DRX inactivity timer or an SL DRX retransmission timer.

14. A first device for performing wireless communication, the first device comprising:
one or more memories storing instructions;
one or more transceivers; and
one or more processors connected to the one or more memories and the one or more transceivers, wherein the one or more processors execute the instructions to:
obtain a sidelink (SL) discontinuous reception (DRX) configuration related to a second device;
select a first resource included within a first active time related to the SL DRX configuration, for a transmission of a first medium access control (MAC) protocol data unit (PDU),
wherein the first active time includes a time during which a timer started based on a time of the first resource is running;
transmit, to the second device, first sidelink control information (SCI) including information related to the first resource; and
reselect the first resource to a third resource after the first resource within the first active time, based on pre-emption for the first resource.

15. A device adapted to control a first user equipment (UE), the device comprising:
one or more processors; and
one or more memories operably connectable to the one or more processors and storing instructions, wherein the one or more processors execute the instructions to:
obtain a sidelink (SL) discontinuous reception (DRX) configuration related to a second UE;
select a first resource included within a first active time related to the SL DRX configuration, for a transmission of a first medium access control (MAC) protocol data unit (PDU),
wherein the first active time includes a time during which a timer started based on a time of the first resource is running;
transmit, to the second UE, first sidelink control information (SCI) including information related to the first resource; and
reselect the first resource to a third resource after the first resource within the first active time, based on pre-emption for the first resource.

* * * * *